US008810694B2

(12) United States Patent
Hirai et al.

(10) Patent No.: US 8,810,694 B2
(45) Date of Patent: Aug. 19, 2014

(54) DEVICE AND COMPUTER-READABLE RECORDING MEDIUM FOR IMAGING AND IMAGE PROCESSING WITH COLOR CORRECTION

(71) Applicant: Fujitsu Limited, Kawasaki (JP)

(72) Inventors: Yukio Hirai, Akashi (JP); Masayoshi Shimizu, Hadano (JP); Hiroyasu Yoshikawa, Akashi (JP); Nobuyuki Kanto, Kobe (JP); Takuya Kamimura, Kobe (JP)

(73) Assignee: Fujitsu Limited, Kawasaki (JP)

( * ) Notice: Subject to any disclaimer, the term of this patent is extended or adjusted under 35 U.S.C. 154(b) by 93 days.

(21) Appl. No.: 13/657,192

(22) Filed: Oct. 22, 2012

(65) Prior Publication Data

US 2013/0141611 A1    Jun. 6, 2013

(30) Foreign Application Priority Data

Dec. 2, 2011    (JP) ................................. 2011-265208

(51) Int. Cl.
| | |
|---|---|
| *H04N 9/64* | (2006.01) |
| *H04N 9/73* | (2006.01) |
| *H04N 17/02* | (2006.01) |
| *G06K 9/00* | (2006.01) |
| *H04N 5/357* | (2011.01) |
| *G06T 5/00* | (2006.01) |
| *H04N 17/00* | (2006.01) |
| *H04N 1/60* | (2006.01) |

(52) U.S. Cl.
CPC ................ *H04N 5/357* (2013.01); *G06T 5/002* (2013.01); *H04N 17/002* (2013.01); *H04N 1/6033* (2013.01)
USPC ......... 348/242; 348/188; 348/223.1; 382/167

(58) Field of Classification Search
CPC ......... H04N 5/357; H04N 5/359; H04N 1/60; H04N 1/6002; H04N 1/6005; H04N 1/6008; H04N 1/6033; H04N 17/002; G06T 5/002
USPC ........ 348/242, 187, 188, 223.1; 382/167, 274
See application file for complete search history.

(56) References Cited

U.S. PATENT DOCUMENTS 7,663,668 B2 *   2/2010   Kuno et al. ................. 348/222.1
8,508,609 B2 *   8/2013   Ohara et al. ............... 348/222.1

(Continued)

FOREIGN PATENT DOCUMENTS

JP          2001078204 A  *  3/2001
JP          2003-110860        4/2003

(Continued)

OTHER PUBLICATIONS

Yoshitaka Toyoda, et al., "Near Infrared Cameras to Capture Full Color Images—A Study of Color Reproduction Methods Without an Infrared Cut Filter for Digital Color Cameras", ITE Journal, vol. 64, No. 1, pp. 101-110 (2010).

*Primary Examiner* — John Villecco
(74) *Attorney, Agent, or Firm* — Fujitsu Patent Center

(57) ABSTRACT

A memory unit stores as conversion information which is derived based on a correction coefficient which provides, in a predetermined allowable range from a minimum value, a sum of a norm of a difference between a color difference of a correction target color and a target color which is a target of correction of the correction target color and a correction color obtained by correcting the correction target color using the correction coefficient, and a norm of the correction coefficient to which a predetermined weight coefficient is applied. A color correcting unit converts a color of each pixel of an image captured by an image capturing unit based on the conversion information.

16 Claims, 17 Drawing Sheets

(56) References Cited

U.S. PATENT DOCUMENTS

| | | | |
|---|---|---|---|
| 8,666,153 B2* | 3/2014 | Hung et al. | 382/162 |
| 2007/0146512 A1* | 6/2007 | Suzuki et al. | 348/272 |
| 2008/0278592 A1* | 11/2008 | Kuno et al. | 348/222.1 |
| 2010/0283866 A1* | 11/2010 | Numata | 348/223.1 |
| 2012/0026357 A1* | 2/2012 | Katagairi et al. | 348/223.1 |
| 2013/0088613 A1* | 4/2013 | Kanto et al. | 348/223.1 |
| 2013/0155254 A1* | 6/2013 | Kanto et al. | 348/164 |

FOREIGN PATENT DOCUMENTS

| | | | |
|---|---|---|---|
| JP | 2005-295419 | | 10/2005 |
| JP | 2005303704 A | * | 10/2005 |
| JP | 2005354457 A | * | 12/2005 |
| JP | 2006-094112 | | 4/2006 |
| JP | 2006-101231 | | 4/2006 |
| JP | 2007194892 A | * | 8/2007 |
| JP | 2013150269 A | * | 8/2013 |

* cited by examiner

DEVICE AND COMPUTER-READABLE RECORDING MEDIUM FOR IMAGING AND IMAGE PROCESSING WITH COLOR CORRECTION

CROSS-REFERENCE TO RELATED APPLICATIONS

This application is based upon and claims the benefit of priority of the prior Japanese Patent Application No. 2011-265208, filed on Dec. 2, 2011, the entire contents of which are incorporated herein by reference.

FIELD

The embodiments discussed herein are directed to an imaging device and an image processing device.

BACKGROUND

Conventionally, an imaging device such as a digital camera which captures an image by means of visible light is provided with an infrared cut filter to cut infrared light, and captures an image by means of only visible light. Meanwhile, an imaging device which is used for monitoring cameras and the like, and has an active sensor which captures images by radiating infrared light captures images by means of visible light and infrared light without an infrared cut filter. These images captured by means of visible light and infrared light change a tinge of color compared to an image captured by means of only visible light due to an influence including infrared light.

By the way, to use one device both for capturing images by means of visible light and capturing images by means of infrared light, this device may be configured to include a detachable mechanism of attaching and detaching an infrared cut filter to and from an imaging device. However, when the detaching mechanism is provided, the imaging device becomes larger, and manufacturing cost increases. For mobile terminals such as mobile telephones and smart phones which have cameras in particular, an increase in the size of devices is a problem.

Hence, a technique of correcting a color of an image captured by means of visible light and infrared light using a matrix operation without an infrared cut filter is proposed.
Patent Literature 1: Japanese Laid-open Patent Publication No. 2006-094112
Patent Literature 2: Japanese Laid-open Patent Publication No. 2006-101231
Patent Literature 3: Japanese Laid-open Patent Publication No. 2005-295419
Patent Literature 4: Japanese Laid-open Patent Publication No. 2003-110860
Non-Patent Literature 1: TOYODA Yoshitaka, et al. "Near Infrared Cameras to Capture Full Color Images—A Study of Color Reproduction Methods Without an Infrared Cut Filter for Digital Color Cameras-", *ITE Journal*, Vol. 64, No 1, pp. 101-110, 2010

Hereinafter, a conventional example of color correction will be described. A value of each pixel of an image which indicates a color is determined based on a predetermined gradation such as 256 gradations in color spaces of R (Red), G (Green) and B (Blue). When an uncorrected color is X and a target color resulting from correction of the color X is Y, the uncorrected color X of N pixels and the target color Y are represented by a matrix of RGB 3 colors×N in following equation 1 and equation 2.

$$x = \begin{bmatrix} Rx1 & Rx2 & Rx3 & Rx4 & \ldots & RxN \\ Gx1 & Bx2 & Bx3 & Gx4 & \ldots & GxN \\ Bx1 & Gx2 & Gx3 & Bx4 & \ldots & BxN \end{bmatrix} \quad (1)$$

$$y = \begin{bmatrix} Ry1 & Ry2 & Ry3 & Ry4 & \ldots & RyN \\ Gy1 & By2 & By3 & Gy4 & \ldots & GyN \\ By1 & Gy2 & Gy3 & By4 & \ldots & ByN \end{bmatrix} \quad (2)$$

A correction coefficient B for correcting the uncorrected color X to the target color Y is set to the matrix of 3×3 as indicated in following equation 3.

$$B = \begin{bmatrix} \alpha r & \alpha g & \alpha b \\ \beta r & \beta g & \beta b \\ \gamma r & \gamma g & \gamma b \end{bmatrix} \quad (3)$$

The target color Y is represented by an operation of the correction coefficient for the uncorrected color X as indicated in following equation 4.

$$Y = B \cdot X \quad (4)$$

The correction coefficient B can preferably convert the uncorrected color X close to the target color Y as much as possible. Hence, this correction coefficient B is determined by solving a minimization problem in following equation 5.

$$\min \|y - Bx\|^2 \quad (5)$$

The correction coefficient B is calculated as a pseudo inverse matrix as indicated in following equation 6. "$x^t$" represents a transposed matrix of x.

$$B = y \cdot x^t / x \cdot x^t \quad (6)$$

When a corrected color corrected from the uncorrected color X using the corrected coefficient B is $Y_{out}$, $Y_{out}$ is represented as in following equation 7.

$$Y_{out} = B \cdot x \quad (7)$$

Meanwhile, when an image is corrected using the correction coefficient B calculated according to equation 6, a phenomenon occurs that the corrected image includes significant noise.

Meanwhile, an example of the phenomenon that noise becomes significant will be described using an image obtained by capturing a color checker target made by X-Rite, Inc. FIG. 18 is a view illustrating an example of an image obtained by capturing a color checker target by an imaging device provided with an infrared cut filter. FIG. 19 is a view illustrating an example of an image obtained by capturing the color checker target by the imaging device without the infrared cut filter. As illustrated in FIGS. 18 and 19, a color checker target 200 has rectangular color sample areas 201 of 24 colors including a gray tone. FIG. 19 illustrates that a tinge of color changes compared to FIG. 18. This means that the infrared cut filter is not provided, and therefore infrared light is also incident on a light receiving unit of each color of RGB of an imaging element in addition to visible light and the tinge of color changes due to an influence of electrical charges resulting from the received infrared light.

By performing an operation indicated in equation 6 assuming each color in FIG. 18 is the target color Y and each color in FIG. 19 is the uncorrected color X, the correction coefficient B of converting the uncorrected color X into the target color Y is calculated. An example of the correction coefficient B calculated by performing the operation indicated in equation 6 is indicated in equation 8.

$$B = \begin{pmatrix} 0.1140 & 3.2487 & -2.3859 \\ -1.5110 & 5.5897 & -2.7685 \\ -1.4184 & 4.2156 & -1.7509 \end{pmatrix} \quad (8)$$

Further, correction is performed by calculating a corrected color $Y_{out}$ per pixel by performing conversion indicated in equation 7 for the color X of each pixel of the image in FIG. 19 using the correction coefficient B. FIG. 20 is a view illustrating an example of an image obtained by correcting the image in FIG. 19 using the correction coefficient B. FIG. 20 illustrates there is more significant noise compared to FIG. 18.

Meanwhile, to clarify a change of an image resulting from correction, RGB values indicating colors are converted into brightness Y and color differences I and Q per corresponding pixel between the uncorrected image and the corrected image, and are compared. FIG. 21A is a graph illustrating an example where the brightness Y of corresponding pixels of the image in FIG. 18 and an image in FIG. 20 are compared. With an example in FIG. 21A, the brightness Y of each pixel along a broken line in FIG. 18 is indicated as a target value, and the brightness Y of each pixel along a broken line in FIG. 20 is indicated as a correction value. FIG. 21B is a graph illustrating an example where the color difference I between corresponding pixels of the image in FIG. 18 and the image in FIG. 20 is compared. With an example in FIG. 21B, the color difference I of each pixel along the broken line in FIG. 18 is indicated as a target value, and the color difference I of each pixel along the broken line in FIG. 20 is indicated as a correction value. FIG. 21C is a graph illustrating an example where the color difference Q between corresponding pixels of the image in FIG. 18 and the image in FIG. 20 is compared. With an example in FIG. 21C, the color difference Q of each pixel along the broken line in FIG. 18 is indicated as a target value, and the color difference Q of each pixel along the broken line in FIG. 20 is indicated as a correction value.

As illustrated in FIGS. 21B and 21C, the color differences I and Q change such that a correction value changes close to a target value. That is, the change in the tinge of color resulting from correction is a little. Meanwhile, as illustrated in FIG. 21A, the correction value of the brightness Y significantly changes with respect to the target value. A reason that the correction value of the brightness Y significantly changes with respect to the target value is that, when a mix amount of infrared light for the imaging element is large, each element of the correction coefficient B is much larger than 1 and, as a result, noise in the corrected image is emphasized.

In order to reduce noise in the brightness Y, a weight is applied to the correction coefficient B. For example, a minimization problem will be described that, as indicated in following equation 9, a term of a weight coefficient λ is added to the correction coefficient B using a Tikhonov regularization method, and a norm of a target color Y and a correction color obtained by correcting the uncorrected color X using a correction coefficient B' is regularized.

$$\min(\|y - B'x\|^2 + \lambda^2 \|B'\|^2) \quad (9)$$

This correction coefficient B' is calculated according to following equation 10.

$$B' = y \cdot x' / (x \cdot x' + \lambda^2 \cdot I) \quad (10)$$

Meanwhile, I represents a unit matrix.

For example, equation 11 indicates an example of the correction coefficient B' calculated by performing an operation indicated in equation 10 when λ=30 is true.

$$B = \begin{pmatrix} 0.6786 & 0.7495 & -0.9007 \\ -0.0724 & 1.2677 & -0.6486 \\ -0.2512 & 0.9837 & -0.2544 \end{pmatrix} \quad (11)$$

An image is corrected by converting the color X of each pixel of the image in FIG. 19 using the correction coefficient B' calculated according to equation 8 and calculating the corrected color $Y_{out}$ per pixel. FIG. 22 is a view illustrating an example of an image obtained by correcting the image in FIG. 19 using the correction coefficient B'. FIG. 22 illustrates that noise decreases compared to FIG. 20 and the tinge of color significantly changes compared to FIG. 18.

Meanwhile, to clarify a change of an image resulting from correction, RGB values indicating colors are converted into the brightness Y and color differences I and Q per corresponding pixel between the uncorrected image and the corrected image, and are compared. FIG. 23A is a graph illustrating an example where the brightness Y of the image in FIG. 18 and an image in FIG. 22 are compared. With an example in FIG. 23A, the brightness Y of each pixel along the broken line in FIG. 18 is indicated as a target value, and the brightness Y of each pixel along the broken line in FIG. 22 is indicated as a correction value. FIG. 23B is a graph illustrating an example where the color difference between corresponding pixels of the image in FIG. 18 and the image in FIG. 22 is compared. With an example in FIG. 23B, the color difference I of each pixel along the broken line in FIG. 18 is indicated as a target value, and the color difference I of each pixel along the broken line in FIG. 22 is indicated as a correction value. FIG. 23C is a graph illustrating an example where the color difference Q between corresponding pixels of the image in FIG. 18 and the image in FIG. 22 is compared. With an example in FIG. 23C, the color difference Q of each pixel along the broken line in FIG. 18 is indicated as a target value, and the color difference Q of each pixel along the broken line in FIG. 22 is indicated as a correction value.

As illustrated in FIG. 23A, a correction value of the brightness Y changes close to the target value and in a small range. That is, noise resulting from correction is a little. Meanwhile, as illustrated in FIGS. 23B and 23C, correction values of the color differences I and Q change from the target values. That is, the tinge of color changes due to correction.

Thus, while the corrected brightness Y includes significant noise when a weight is not applied the color differences I and Q are close to the target values. Meanwhile, when a weight is applied, while the corrected brightness Y includes little noise, the color differences I and Q are different. As described above, the noise and the tinge of color have a trade-off relationship.

SUMMARY

According to an aspect of an embodiment, An imaging device includes a memory unit that stores conversion information which is derived based on a correction coefficient which provides, in a predetermined allowable range from a minimum value, a sum of a norm of a difference between a color difference of a correction target color and a target color which is a target of correction of the correction target color and a correction color obtained by correcting the correction target color using the correction coefficient, and a norm of the correction coefficient to which a predetermined weight coefficient is applied; an image capturing unit that captures an image; and a color converting unit that converts a color of each pixel of the image captured by the image capturing unit, based on the conversion information stored in the memory unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. In addition, these embodiments by no means limit the present invention. Further, each embodiment can be adequately combined to such an extent that processing content does not contradict. A case will be described below where the present invention is applied to an image capturing system.

[a] First Embodiment

Figure 1:
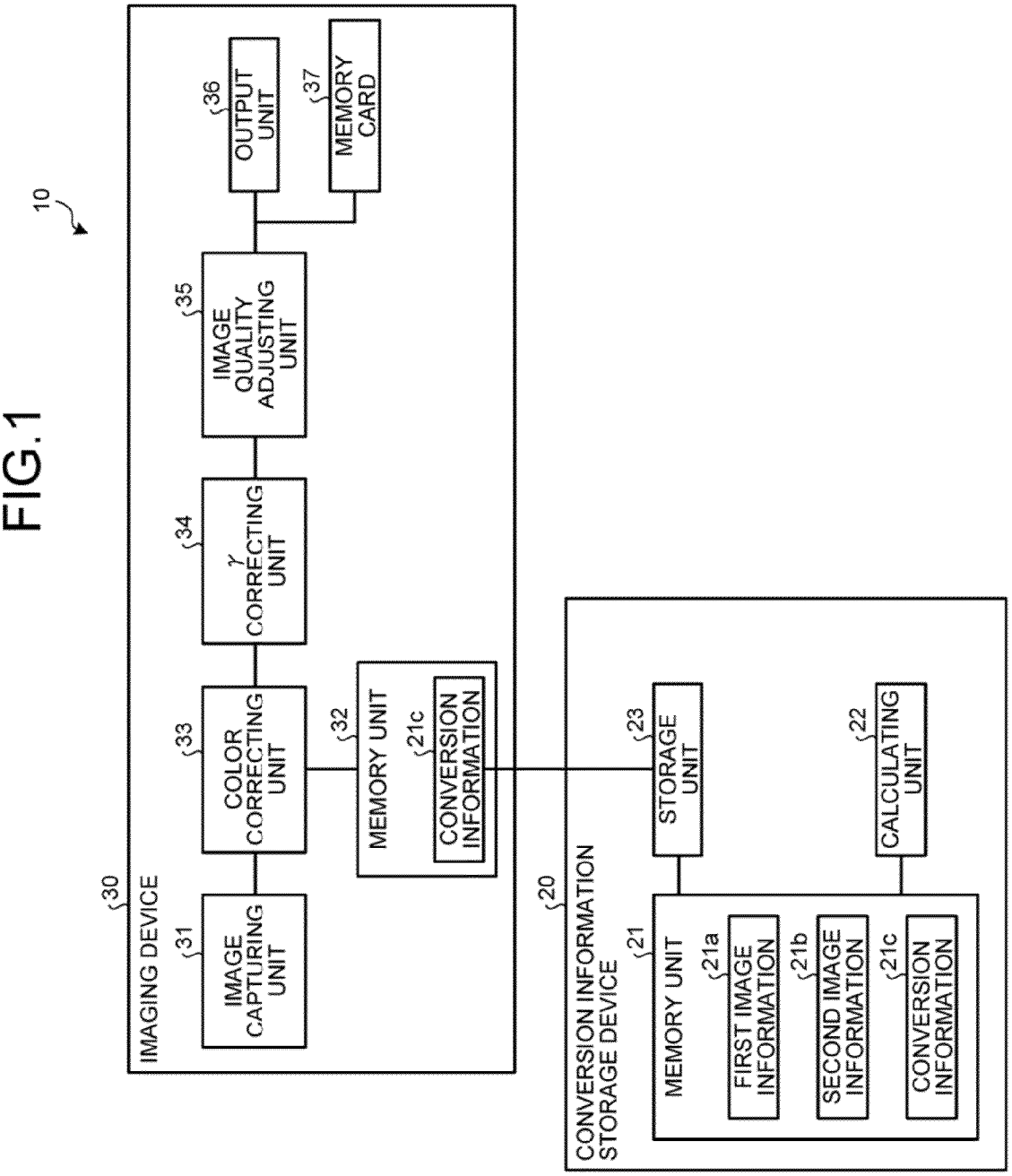
FIG. 1 is a view illustrating an example of an entire configuration of an image capturing system.

An image capturing system according to a first embodiment will be described. FIG. 1 is view illustrating an example of an entire configuration of the image capturing system. As illustrated in FIG. 1, an image capturing system 10 has a conversion information storage device 20 and an imaging device 30. The conversion information storage device 20 is a device which derives conversion information which is used to correct an image captured by the imaging device 30 and which stores the derived conversion information in the imaging device 30, and is, for example, a computer. The conversion information storage device 20 is provided at, for example, a factory for manufacturing or inspecting the imaging devices 30, and stores conversion information in the imaging device 30. The conversion information storage device 20 has a memory unit 21, a calculating unit 22 and a storage unit 23.

The memory unit 21 stores various pieces of information. For example, the memory unit 21 stores first image information 21*a*, second image information 21*b* and conversion information 21*c*. The first image information 21*a* is image information of an image including a correction target color which is a correction target. The second image information 21*b* is image information including a target color which is a target of correction of a correction target color. An image indicated by the second image information 21*b* is, for example, an image obtained by capturing a target by providing an infrared cut filter, and corresponds to, for example, an image obtained by capturing a color checker target by providing an infrared cut filter illustrated in FIG. 18. An image indicated by the first image information 21*a* is, for example, an image obtained by capturing the same target as the second image information 21*b* without the infrared cut filter, and corresponds to, for example, an image obtained by capturing the color checker target by providing the infrared cut filter in FIG. 19. The first image information 21*a* and the second image information 21*b* may be captured by one imaging device to which the infrared cut filter is detachable. Further, the first image information 21*a* and the second image information 21*b* are captured by an imaging device provided with the infrared cut filter and an imaging device without the infrared cut filter, respectively. An example of a device of the memory unit 21 is data rewritable semiconductor memory such as flash memory or NVSRAM (Non Volatile Static Random Access Memory), or a storage device such as a hard disk and an optical disk.

The calculating unit 22 performs various types of calculation. For example, the calculating unit 22 calculates a correction coefficient A for correcting a color of an image captured by the imaging device 30, from the first image information 21*a* and the second image information 21*b*.

Hereinafter, the correction coefficient A calculated by the calculating unit 22 will be described. A filtered image which is captured by providing the infrared cut filter is an image captured by means of visible light. Meanwhile, an unfiltered image which is captured without providing the infrared cut filter is an image captured by means of visible light and infrared light, and includes infrared light compared to a filtered image. Hence, when RGB pixel values of pixels of the filtered image are $R_{in}$, $G_{in}$ and $B_{in}$ and RGB pixel values of pixels of the unfiltered image are $R_{out}$, $G_{out}$ and $B_{out}$, and RGB pixel values of infrared light are $\Delta R$, $\Delta G$ and $\Delta B$, a relationship according to following equation 12 holds.

$$R_{out}=R_{in}+\Delta R$$

$$G_{out}=G_{in}+\Delta G$$

$$B_{out}=B_{in}+\Delta B \quad (12)$$

Although the rate of infrared light included in light to be radiated varies depending on a lighting and is determined. Hence, when the correction coefficient A is determined as a matrix of 3×3, a relationship according to following equation 13 holds.

$$\begin{pmatrix} \Delta R \\ \Delta G \\ \Delta B \end{pmatrix} = A \times \begin{pmatrix} R_{out} \\ G_{out} \\ B_{out} \end{pmatrix} \quad (13)$$

A matrix of RGB pixel values $R_{out}$, $G_{out}$ and $B_{out}$ of pixels of the unfiltered image is a correction target color X as indicated in equation 14. Further, as indicated in equation 15, a matrix of pixel values $R_{in}$, $G_{in}$ and $B_{in}$ of pixels of the filtered image is a target color Y which is a target of correction of the correction target color X.

$$X = \begin{pmatrix} R_{out} \\ G_{out} \\ B_{out} \end{pmatrix} \quad (14)$$

$$Y = \begin{pmatrix} R_{in} \\ G_{in} \\ B_{in} \end{pmatrix} \quad (15)$$

Equation 12 can be represented as in following equation 16 based on equations 13, 14 and 15. In addition, −A is changed to the new correction coefficient A.

$$Y=X+A\cdot X \quad (16)$$

Meanwhile, pixel values $\Delta R$, $\Delta G$ and $\Delta B$ of infrared light refer to a color difference dy of the correction target color X from the target color Y as indicated in following equation 17.

$$dy=Y-X \quad (17)$$

This equation 17 can be represented as in following equation 18.

$$Y=X+dy \quad (18)$$

The correction coefficient A can preferably convert the correction target color X close to the color difference dy as much as possible according to above equations 16 and 18. This correction coefficient A can be determined by calculating the correction coefficient of regularizing the norm of a difference between the color difference dy of the correction target color X from the target color Y and a correction color obtained by correcting the correction target color X using the correction coefficient A. With the present embodiment, calculation of the correction coefficient A using the Tikhonov regularization method to reduce noise will be described. As indicated in, for example, following equation 19, a minimization problem will be described that the correction coefficient is calculated which provides a minimum value of a sum of the norm of the difference between the color difference dy and the correction color obtained by correcting the correction target color X using the correction coefficient A and the norm of the correction coefficient A to which a predetermined weight coefficient λ is applied.

$$\min(\|dy-Ax\|^2+\lambda^2\|A\|^2) \quad (19)$$

This correction coefficient A is calculated according to following equation 20.

$$A=dy\cdot x^t/(x\cdot x^t+\lambda^2\cdot I) \quad (20)$$

The calculating unit 22 calculates the correction coefficient A by performing an operation indicated in equation 20 based on the first image information 21*a* and the second image information 21*b* stored in the memory unit 21.

Figure 18:
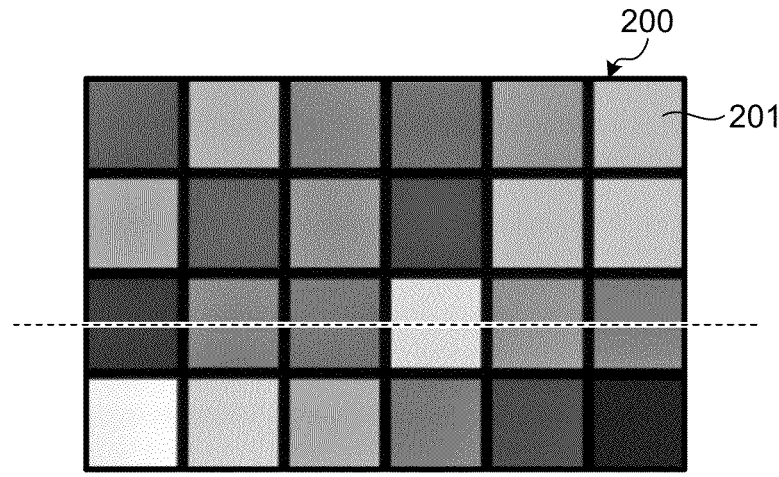
FIG. 18 is a view illustrating an example of an image obtained by capturing a color checker target by an imaging device by providing an infrared cut filter.
Figure 19:
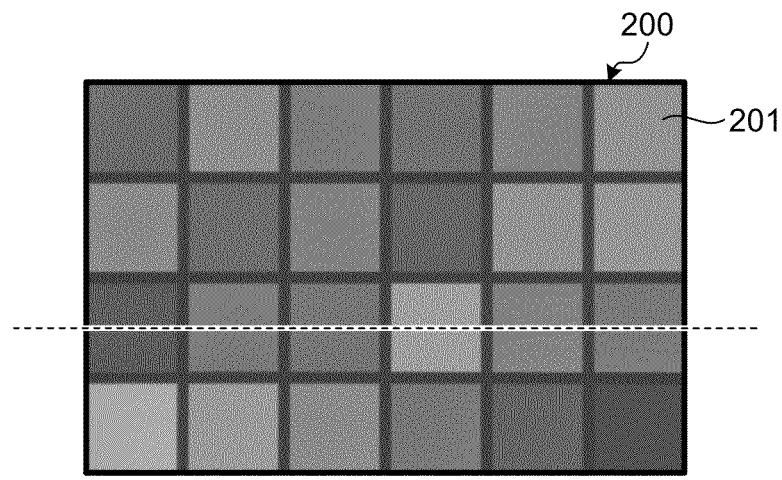
FIG. 19 is a view illustrating an example of an image obtained by capturing a color checker target by the imaging device without the infrared cut filter.
Figure 20:
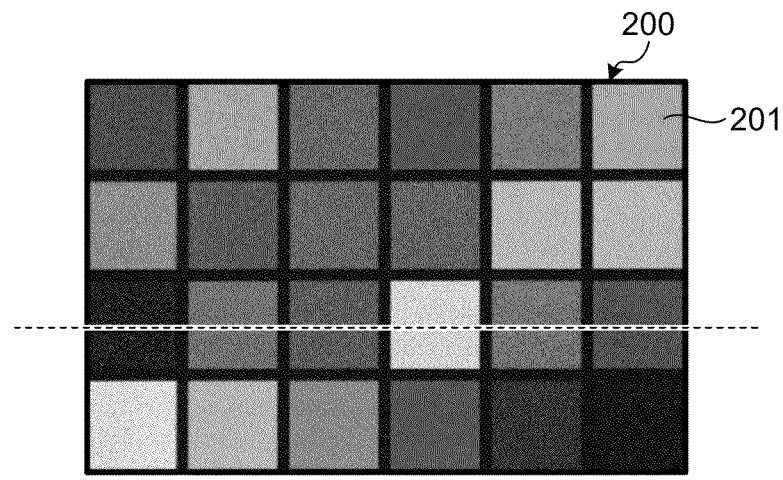
FIG. 20 is a view illustrating an example of an image obtained by correcting the image in FIG. 19 using a correction coefficient B.
Figure 21A:
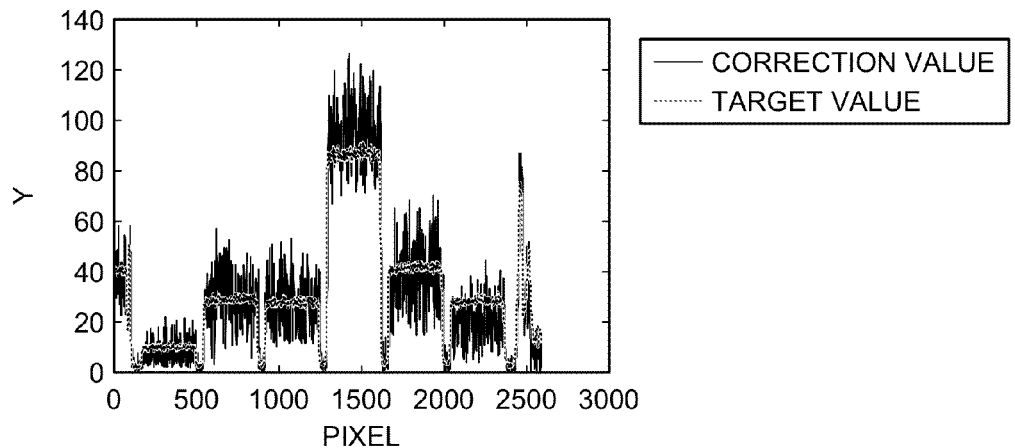
FIG. 21A is a graph illustrating an example where the brightness Y of corresponding pixels of the image in FIG. 18 and an image in FIG. 20 are compared.
Figure 21B:
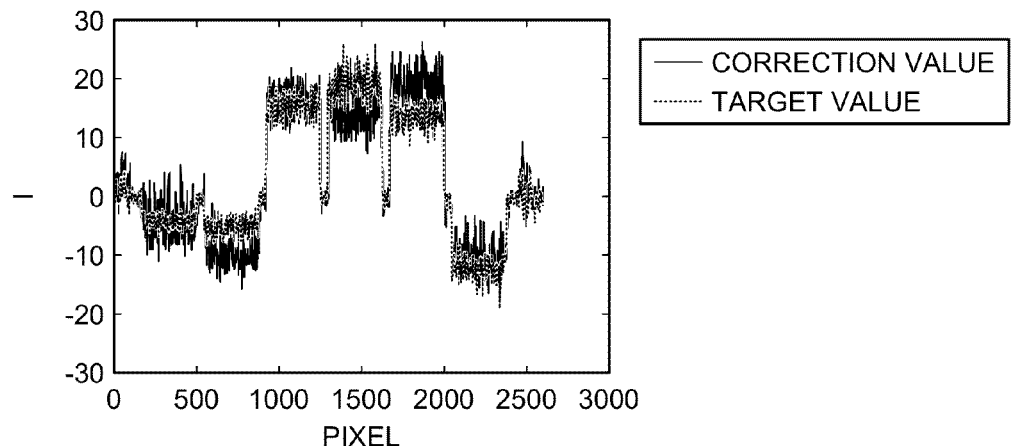
FIG. 21B is a graph illustrating an example where the color difference I between corresponding pixels of the image in FIG. 18 and the image in FIG. 20 are compared.
Figure 21C:
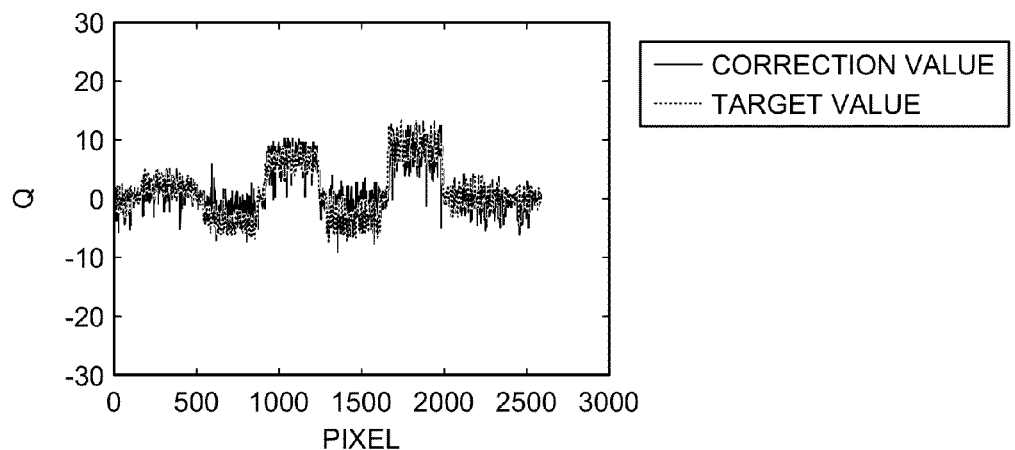
FIG. 21C is a graph illustrating an example where the color difference Q between corresponding pixels of the image in FIG. 18 and the image in FIG. 20 are compared.
Figure 22:
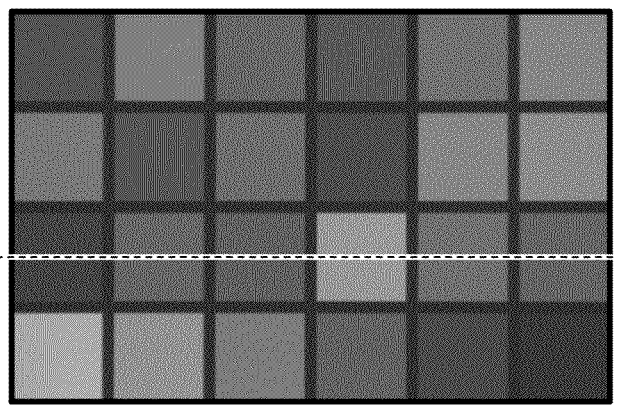
FIG. 22 is a view illustrating an example of an image obtained by correcting the image in FIG. 19 using a correction coefficient B'.
Figure 23A:
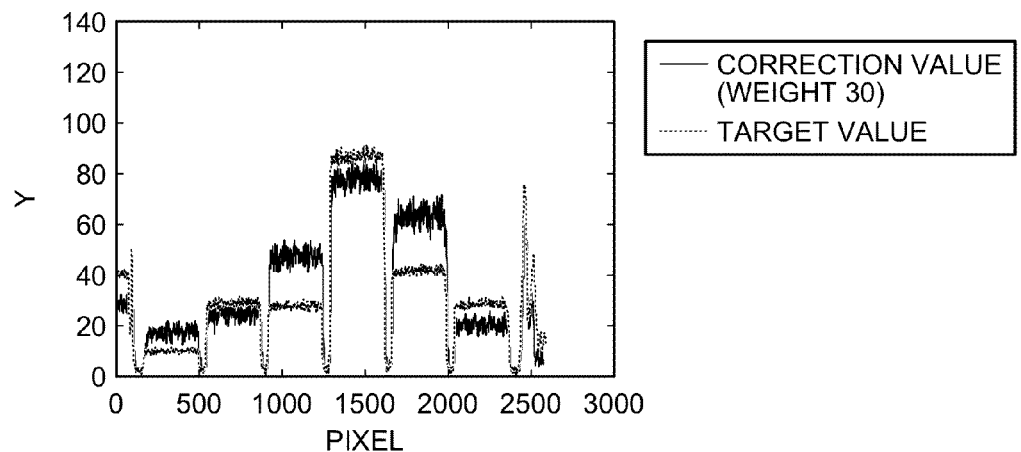
FIG. 23A is a graph illustrating an example where the brightness Y of corresponding pixels of the image in FIG. 18 and an image in FIG. 22 are compared.
Figure 23B:
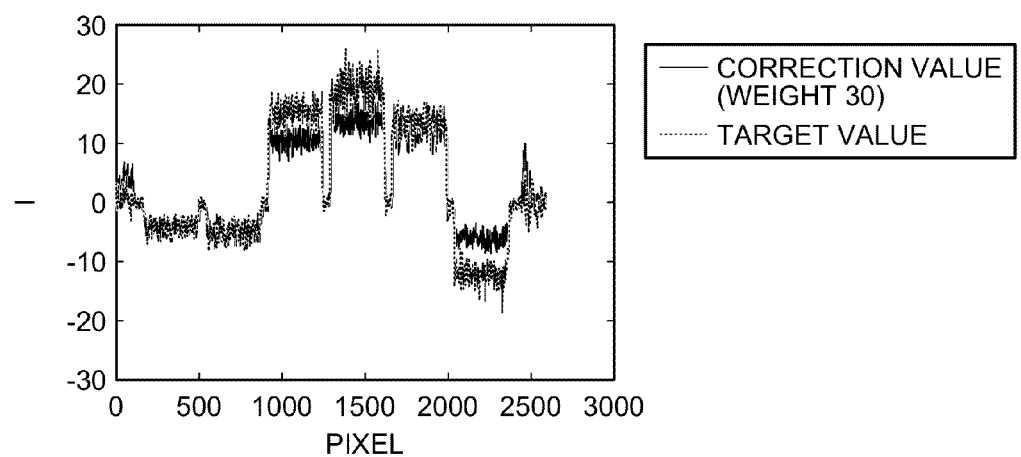
FIG. 23B is a graph illustrating an example where the color difference I between corresponding pixels of the image in FIG. 18 and the image in FIG. 22 is compared.
Figure 23C:
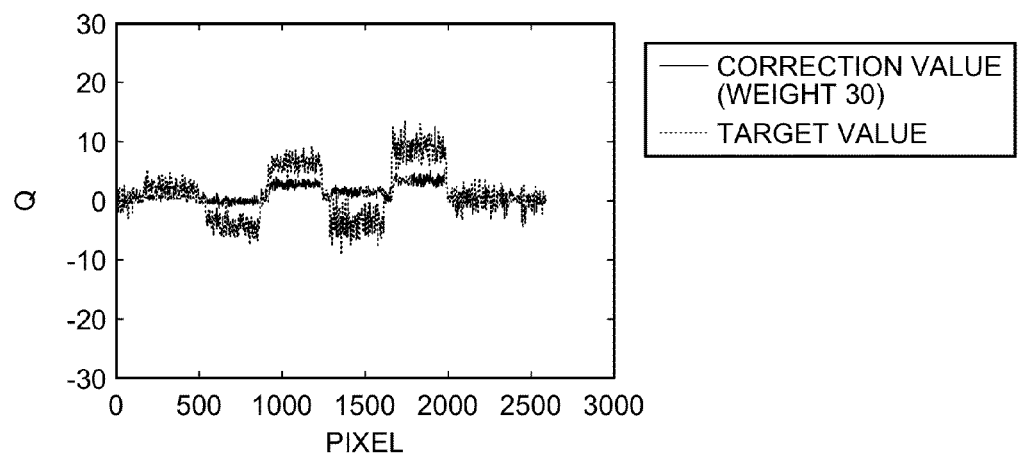
FIG. 23C is a graph illustrating an example where the color difference Q between corresponding pixels of the image in FIG. 18 and the image in FIG. 22 is compared.

An example of the correction coefficient A calculated by performing an operation indicated in equation 20 when each color in FIG. 18 is the target color Y, each color in FIG. 19 is the correction target color X and λ=30 is true is indicated in equation 21. The calculating unit 22 has the memory unit 21 store the calculated correction coefficient A as the conversion information 21*c*.

$$A = \begin{pmatrix} -0.0865 & 0.5311 & -0.9502 \\ -0.2908 & 0.8518 & -0.9112 \\ -0.3008 & 0.7211 & -0.9919 \end{pmatrix} \quad (21)$$

Figure 2:
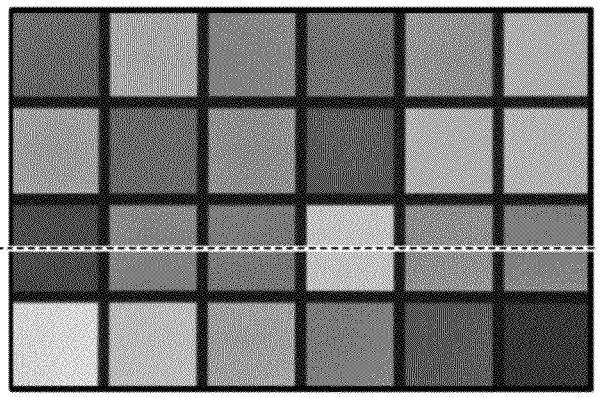
FIG. 2 is a view illustrating an example of an image obtained by correcting an image in FIG. 19 using a correction coefficient A.

With the present embodiment, a color is corrected by performing an operation indicated in above equation 16 assuming that a RGB pixel value of each pixel of a correction target image is X and calculating a corrected RGB pixel value Y. FIG. 2 is a view illustrating an example of an image obtained by correcting an image in FIG. 19 using the correction coefficient A. In addition, the correction coefficient A is calculated assuming that a weight coefficient λ=30 is true, and is used. The image in FIG. 2 is corrected to an image which is close to an image captured by providing the infrared cut filter illustrated in FIG. 18.

Figure 3A:
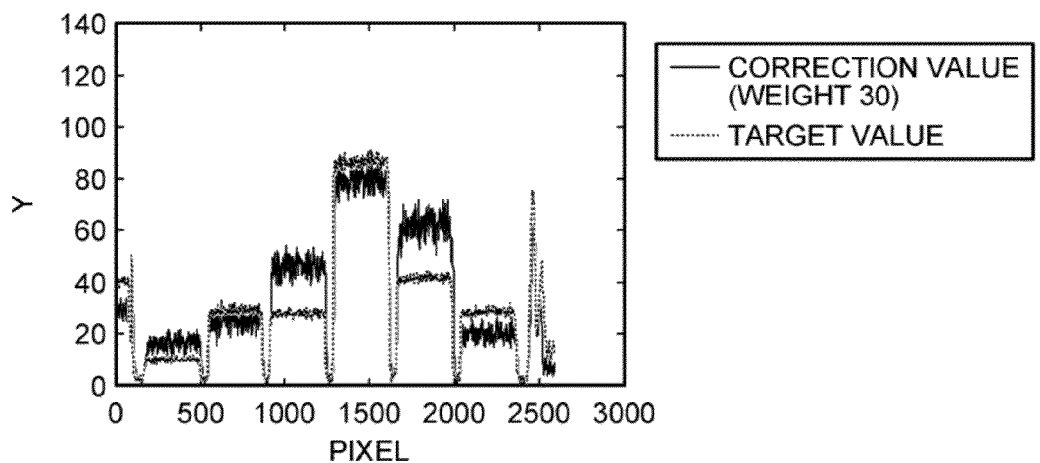
FIG. 3A is a graph illustrating an example where brightness Y of corresponding pixels of an image in FIG. 18 and an image in FIG. 2 are compared.
Figure 3B:
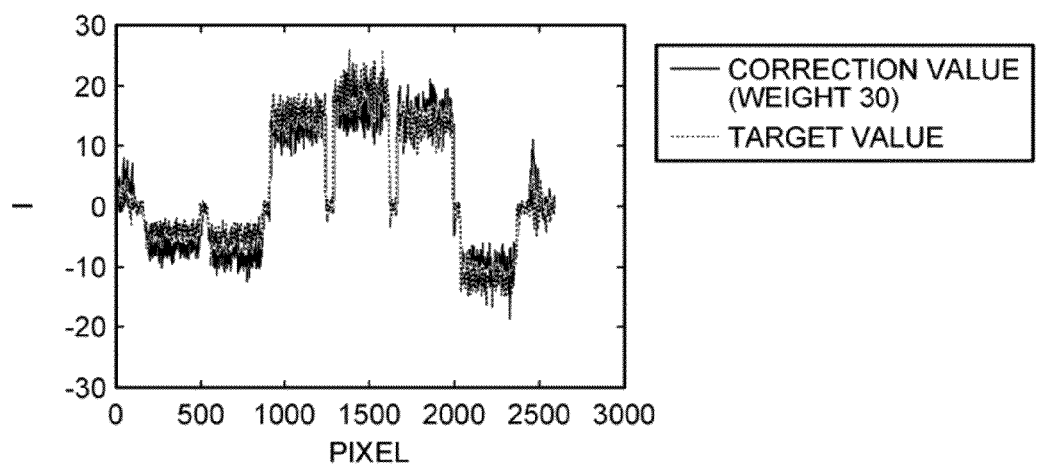
FIG. 3B is a graph illustrating an example where a color difference I between corresponding pixels of the image in FIG. 18 and the image in FIG. 2 is compared.
Figure 3C:
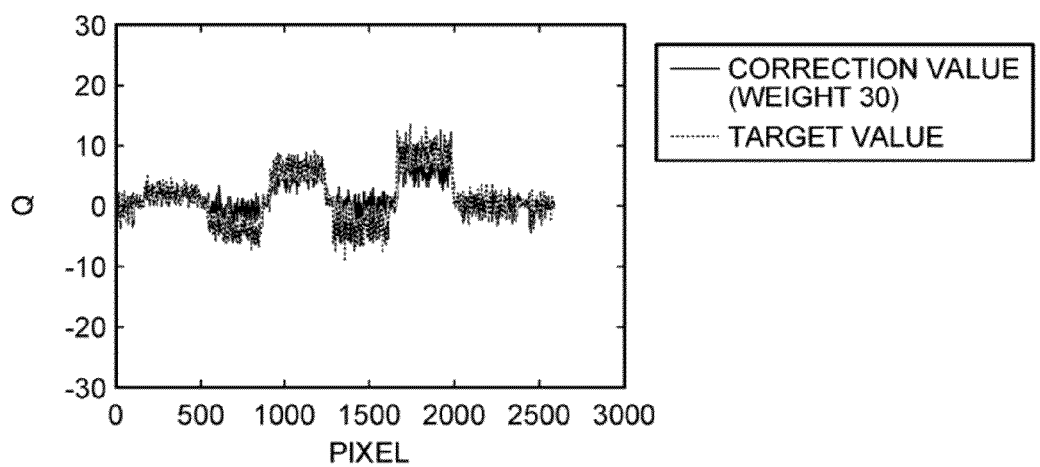
FIG. 3C is a graph illustrating an example where a color difference Q between corresponding pixels of the image in FIG. 18 and the image in FIG. 2 is compared.

Meanwhile, to clarify a change of an image resulting from correction, RGB values indicating colors are converted into the brightness Y and the color differences I and Q per corresponding pixel between an uncorrected image and a corrected image, and are compared. FIG. 3A is a graph illustrating an example where the brightness Y of the image in FIG. 18 and the image in FIG. 2 are compared. With an example in FIG. 3A, the brightness Y of each pixel along the broken line in FIG. 18 is indicated as a target value, and the brightness Y of each pixel along the broken line in FIG. 2 is indicated as a correction value. FIG. 3B is a graph illustrating an example where the color difference I between corresponding pixels of the image in FIG. 18 and the image in FIG. 2 is compared. With an example in FIG. 3B, the color difference I of each pixel along the broken line in FIG. 18 is indicated as a target value, and the color difference I of each pixel along the broken line in FIG. 2 is indicated as a correction value. FIG. 3C is a graph illustrating an example where the color difference Q between corresponding pixels of the image in FIG. 18 and the image in FIG. 2 is compared. With an example in FIG. 3C, the color difference Q of each pixel along the broken line in FIG. 18 is indicated as a target value, and the color difference Q of each pixel along the broken line in FIG. 2 is indicated as a correction value.

As illustrated in FIG. 3A, a correction value of the brightness Y changes close to the target value and in a small range. That is, noise resulting from correction is little. Further, as illustrated in FIGS. 3B and 3C, correction values of the color differences I and Q change close to a target value. That is, a change in the tinge of color resulting from correction is small.

By correcting a color using the correction coefficient A in this way, an image captured without the infrared cut filter is corrected to an image which is close to an image captured by providing the infrared cut filter.

Meanwhile, although the corrected image has a tinge of color close to an image captured without the infrared cut filter when a value of the weight coefficient λ is smaller, the amount of noise of an image becomes significant. Further, although noise of the corrected image is little when the value of the weight coefficient λ is higher, a change in the tinge of color from an image captured without the infrared cut filter becomes significant. The value of the weight coefficient A is determined according to image quality of the captured image requested to the imaging device 30. When, for example, noise of the captured image is suppressed, a higher value is set to the weight coefficient λ by an administrator. Meanwhile, when the change in the tinge of color of the captured image is suppressed, a small value is set to the weight coefficient λ by an administrator.

The storage unit 23 stores the conversion information 21c in a memory unit 32 of the imaging device 30 which will be described below. In addition, when the conversion information storage device 20 and the imaging device 30 are connected through a wired line such as a USB (Universal Serial Bus), and the storage unit 23 may store the conversion information 21c in the memory unit 32 through the wired line. Further, when a memory card 37 is detachable as described below, the imaging device 30 may have the memory card 37 store the conversion information 21c, and store the conversion information 21c in the memory unit 32 through the memory card 37.

Back to FIG. 1, the imaging device 30 is a device which captures a still image and shoots a movie, and is, for example, a digital camera, a video camera or a monitoring camera. In addition, the imaging device 30 may be a mobile terminal having a camera. The imaging device 30 has an image capturing unit 31, the memory unit 32, a color correcting unit 33, a γ correcting unit 34, an image quality adjusting unit 35, an output unit 36 and the memory card 37.

The image capturing unit 31 captures an image. For example, the image capturing unit 31 has an optical part such as a lens, and an imaging element such as a CCD (Charge Coupled Devices) image sensor or a CMOS (Complementary Metal Oxide Semiconductor) image sensor arranged on an optical axis of the optical part. The image capturing unit 31 does not include the infrared cut filter in the optical part, and visible light and infrared light are incident on the imaging element. With the imaging element, a color filter in which RGB are aligned in a predetermined pattern to meet each pixel is provided on a light receiving surface, and an analog signal matching the amount of light received at each pixel is outputted. The image capturing unit 31 performs various analog signal processings including, for example, noise cancellation processing such as correlated double sampling and amplification processing with respect to an analog signal outputted from the imaging element. Further, the image capturing unit 31 converts an analog signal to which the analog signal is applied, into digital data, performs various digital signal processings such as demosaic processing and outputs image information indicating the captured image. A value indicating a color in color space of RGB according to a predetermined gradation is set to each pixel of this image information.

The memory unit 32 stores various pieces of information. For example, the memory unit 32 stores the conversion information stored by the conversion information storage device 20. An example of a device of the memory unit 32 is data rewritable semiconductor memory such as flash memory or NVSRAM.

Figure 4:
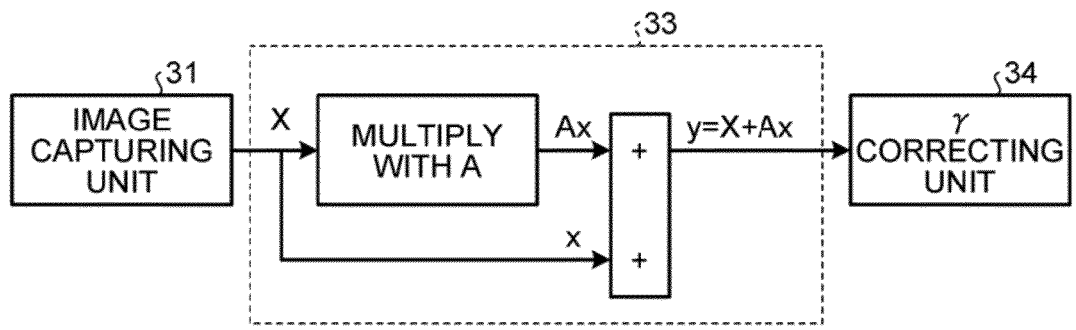
FIG. 4 is a view schematically illustrating a processing flow of a color correcting unit.

The color correcting unit 33 corrects a color of an image captured by the image capturing unit 31. For example, the color correcting unit 33 reads the correction coefficient A stored in the memory unit 32 as the conversion information 21c. Further, the color correcting unit 33 performs an operation indicated in above equation 16 assuming that RGB pixel values of pixels are X per pixel of the image captured by the image capturing unit 31, and calculates the corrected RGB pixel value Y. FIG. 4 is a view schematically illustrating a processing flow of the color correcting unit. The color correcting unit 33 multiplies with the correction coefficient A the RGB pixel value X of each pixel of the image captured by the image capturing unit 31, adds the pixel value X and calculates the corrected RGB pixel value Y. By correcting the color using the correction efficient A in this way, the image captured without the infrared cut filter is corrected to an image which is close to an image captured by providing the infrared cut filter.

The γ correcting unit 34 performs non-linear γ correction of correcting sensitivity characteristics of the image capturing unit 31 with respect to image information for which a color is corrected by the color correcting unit 33, and performs correction such that a change in luminance of the image captured by the image capturing unit 31 and a change in a pixel value are proportional.

The image quality adjusting unit 35 performs various image processings of adjusting image quality of the image. For example, the image quality adjusting unit 35 performs predetermined image processing with respect to image information such that clarity and a contrast of an image indicated by the image information γ-corrected by the γ correcting unit 34 are predetermined image quality.

The output unit 36 outputs various pieces of information. For example, the output unit 36 displays an image for which image quality is adjusted by the image quality adjusting unit 35. An example of a device of the output unit 36 is a display device of a LCD (Liquid Crystal Display). In addition, the output unit 36 may output the image information for which image quality is adjusted by the image quality adjusting unit 35, to an outside.

The memory card 37 stores various pieces of information. For example, the memory card 37 stores image information for which image quality is adjusted by the image quality adjusting unit 35.

Figure 5:
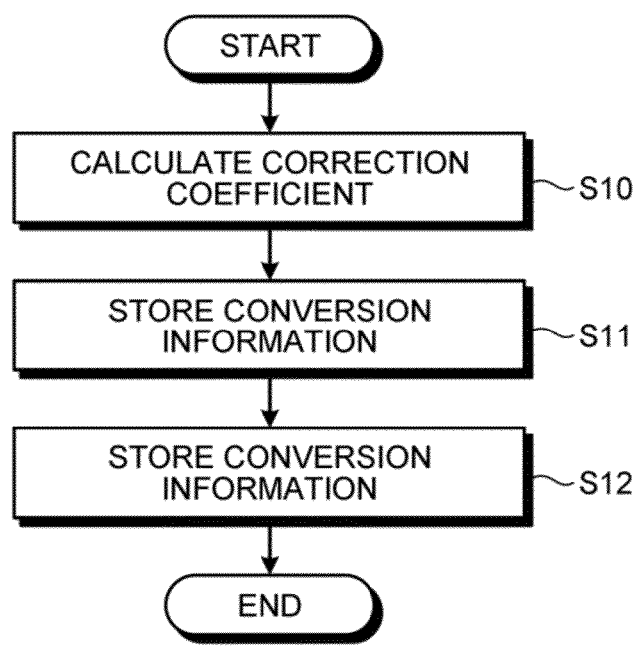
FIG. 5 is a flowchart illustrating process of conversion information storage processing.

Next, a processing flow of the conversion information storage device 20 according to the present embodiment of deriving and storing conversion information in the imaging device 30 will be described. FIG. 5 is a flowchart illustrating process of conversion information storage processing. This conversion information storage processing is executed at, for example, a timing when a predetermined operation of instructing the imaging device 30 to store conversion information is performed. In addition, the conversion information storage processing may be executed at a timing when the imaging device 30 is connected to the conversion information storage device 20.

As illustrated in FIG. 5, the calculating unit 22 calculates the correction coefficient A by performing an operation in equation 20 from the first image information 21a and the second image information 21b stored in the memory unit 21 (step S10). The calculating unit 22 has the memory unit 21 store the calculated correction coefficient A as the conversion information 21c (step S11). The storage unit 23 reads the conversion information 21c from the memory unit 21, stores the conversion information 21c in the memory unit 32 of the imaging device 30 (step S12), and finishes processing. By this means, the correction coefficient A is stored in the memory unit 32 of the imaging device 30.

Figure 6:
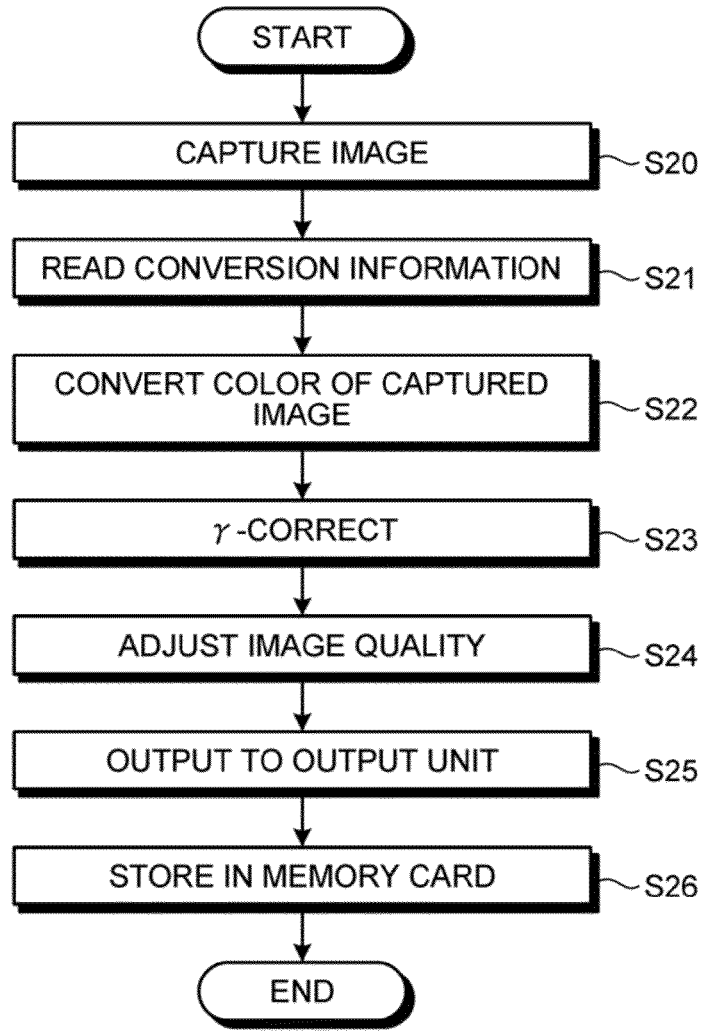
FIG. 6 is a flowchart illustrating process of imaging processing.

Next, a processing flow of the imaging device 30 according to the present embodiment of capturing an image will be described. FIG. 6 is a flowchart illustrating process of imaging processing. This imaging processing is executed at, for example, a timing when a predetermined operation of instructing the imaging device 30 to capture an image is performed.

As illustrated in FIG. 6, the image capturing unit 31 reads an analog signal from each pixel of the imaging element, performs various analog signal processings and digital signal processings, and outputs image information indicating the captured image (step S20). The color correcting unit 33 reads the correction coefficient A stored in the memory unit 32 as the conversion information 21c (step S21). Further, the color correcting unit 33 performs an operation in equation 16 with respect to the image information outputted from the image capturing unit 31 using the read correction coefficient A, and performs correction for converting the color (step S22). The γ correcting unit 34 γ-corrects the image information for which the color is corrected (step S23). The image quality adjusting unit 35 performs predetermined image processing of adjusting image quality of the γ-corrected image information (step S24). The image quality adjusting unit 35 outputs the image for which image quality is adjusted, to the output unit 36 to display (step S25). Further, the image quality adjusting unit 35 has the memory card 37 store the image information for which image quality is adjusted (step S26), and finishes processing.

Thus, the imaging device 30 stores as conversion information the correction coefficient A which provides a minimum value of a sum of a norm of the difference between the color difference of the correction target color X from the target color Y and a corrected correction color obtained by correcting the correction target color X using the correction coefficient A, and a norm of the correction coefficient A to which a predetermined weight coefficient is applied. Further, the imaging device 30 converts the color of each pixel of the image captured by the image capturing unit 31 based on the conversion information. Consequently, the imaging device 30 can correct the image while suppressing the change in the tinge of color and suppressing occurrence of noise. By this means, even when the infrared cut filter is not provided, the imaging device 30 can capture the image which is close to the image in case that the infrared cut filter.

Meanwhile, the conversion information storage device 20 calculates the correction coefficient which provides a minimum value of the sum of the norm of the difference between the color difference of the correction target color X from the target color Y and a correction color obtained by correcting the correction target color X using the correction coefficient A, and the norm of the correction coefficient A to which a predetermined weight coefficient is applied. Further, the conversion information storage device 20 stores the conversion information derived based on the calculated correction coefficient, in the memory unit 32 of the imaging device 30. By this means, by converting the color of each pixel of an image captured based on conversion information, the imaging device 30 can correct an image while suppressing a change in the tinge of color and suppressing occurrence of noise.

[b] Second Embodiment

Next, a second embodiment will be described. Configurations of an image capturing system 10, a conversion information storage device 20 and an imaging device 30 according to the second embodiment are substantially the same as in the image capturing system 10, the conversion information storage device 20 and the imaging device 30 according to the first embodiment illustrated in FIG. 1, and therefore differences will be described.

Meanwhile, above equation 16 can be represented as following equation 22 when a unit matrix is I.

$$Y=(I+A) \cdot X \quad (22)$$

When I+A is a total correction coefficient $A_{Total}$, equation 22 can be represented as following equation 23, and calculation can be simplified.

$$Y=A_{Total} \cdot X \quad (23)$$

Hence, the calculating unit 22 calculates a correction coefficient A from first image information 21a and second image information 21b stored in a memory unit 21, adds the unit matrix to the calculated correction coefficient A and calculates the total correction coefficient $A^{Total}$. Further, the calculating unit 22 has the memory unit 21 store the total correction coefficient $A_{Total}$ as conversion information. The total correction coefficient $A_{Total}$ stored in this memory unit 21 is stored in the memory unit 32 of the imaging device 30 by a storage unit 23.

Figure 7:
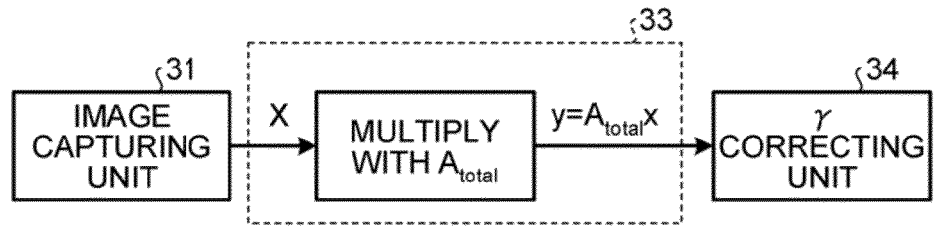
FIG. 7 is a view schematically a processing flow of a color correcting unit.

A color correcting unit 33 reads the total correction coefficient $A_{Total}$ stored in the memory unit 32 as the conversion information 21c, performs an operation indicated in above equation 23 assuming that the RGB pixel value of a pixel is X per pixel of the image captured by the image capturing unit 31, and calculates the corrected RGB pixel value Y. FIG. 7 is a view schematically illustrating a processing flow of the color correcting unit. The color correcting unit 33 multiplies the RGB pixel value X of each pixel of the image captured by the image capturing unit 31, with the total correction coefficient $A_{Total}$, and calculates the corrected RGB pixel value Y.

Thus, the imaging device 30 stores the total correction coefficient $A_{Total}$ obtained by adding the unit matrix to the correction coefficient A as conversion information. Further, the imaging device 30 multiplies each color component forming the color of each pixel of the image captured by the image capturing unit, with the total correction coefficient $A_{Total}$, and converts the color. Consequently, the imaging device 30 can reduce a load of processing of color conversion.

[c] Third Embodiment

Figure 8:
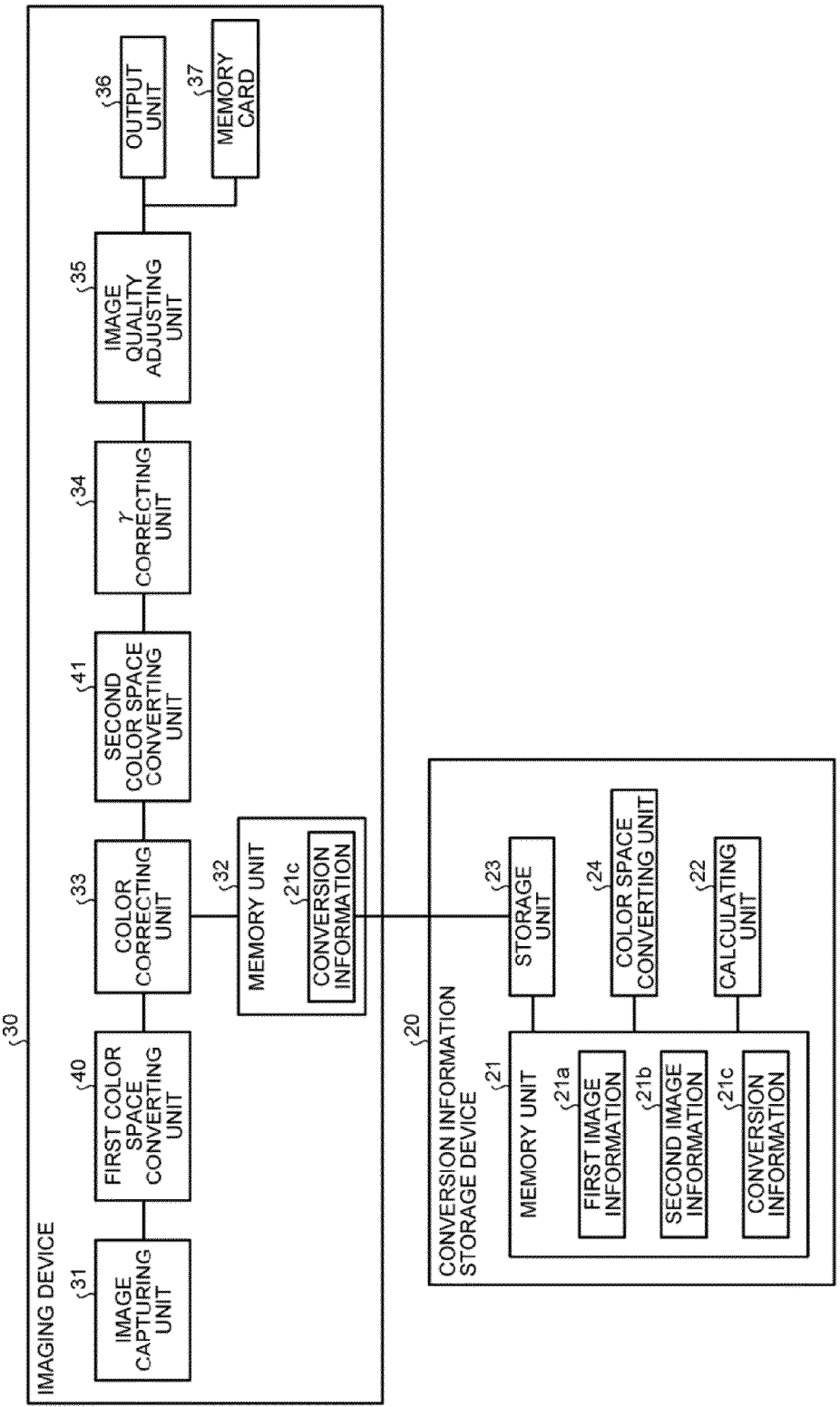
FIG. 8 is a view illustrating an example of an entire configuration of an image capturing system.

Next, a third embodiment will be described. FIG. 8 is a view illustrating an example of an entire configuration of an image capturing system. In addition, the same portions as in an image capturing system according to the first embodiment illustrated in FIG. 1 will be assigned the same reference numerals, and differences will be described.

A conversion information storage device 20 further has a color space converting unit 24. The color space converting unit 24 converts a color space of first image information 21a and second image information 21b into a YIQ color space. When, for example, a conversion coefficient of converting a RGB color space into the YIQ color space is C, a target color is Y and a correction target color is X in the RGB color space, a target color Y' and a correction target color X' in the YIQ color space can be represented by following equations 24 and 25.

$$Y'=C \cdot Y \quad (24)$$

$$X'=C \cdot X \quad (25)$$

A calculating unit 22 calculates a correction coefficient A' for correcting a color of an image captured by an imaging device 30, from the first image information 21a and the second image information 21b converted into the YIQ color space by the color space converting unit 24. For example, a color difference dy' of the correction target color X' from the target color Y' in the YIQ color space can be represented by following equation 26.

$$dy'=Y'-X' \quad (26)$$

Further, a minimization problem indicated in following equation 27 will be described using the Tikhonov regularizing method in the YIQ color space similar to above equation 19.

$$\min(\|dy'-A'x\|^2+\lambda^2\|A'\|^2) \quad (27)$$

This correction coefficient A' is calculated according to following equation 28.

$$A'=dy' \cdot x^t/(x' \cdot x^t + \lambda^2 \cdot I) \quad (28)$$

When, for example, each color in FIG. 18 is a target color Y and each color in FIG. 19 is the correction target color is X, an example of the correction coefficient A' calculated by performing an operation indicated in equation 28 assuming that λ=15 is true after the target color Y and the correction target color X are converted into the YIQ color space is indicated in equation 29.

$$A' = \begin{pmatrix} -0.3584 & 0.4523 & -2.7626 \\ -0.0412 & 0.2149 & 0.3490 \\ -0.1159 & 0.1341 & 0.1644 \end{pmatrix} \quad (29)$$

The calculating unit 22 has a memory unit 21 store the calculated correction coefficient A' as conversion information 21c. The correction coefficient A' stored in this memory unit 32 is stored in the memory unit 32 of the imaging device 30 by a storage unit 23.

Meanwhile, the imaging device 30 further has a first color space converting unit 40 and a second color space converting unit 41. The first color space converting unit 40 converts the color space of the image captured by an image capturing unit 31 into the YIQ color space.

A color correcting unit 33 reads the correction coefficient A' stored in the memory unit 32 as the conversion information 21c. Further, the color correcting unit 33 calculates the corrected pixel value Y' in the YIQ color space by performing an operation indicated in following equation 30 assuming that the pixel value converted into the YIQ color space by the first color space converting unit 40 is X'.

$$Y'=X'+A' \cdot X' \quad (30)$$

Figure 9:
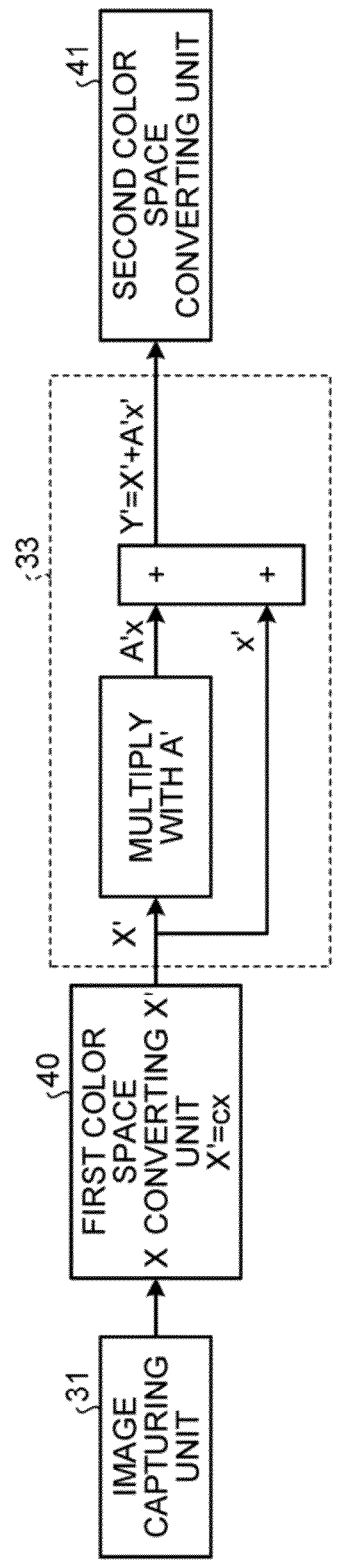
FIG. 9 is a view schematically illustrating a processing flow of a first color space converting unit and a color correcting unit.

FIG. 9 is a view schematically illustrating a processing flow of a first color space converting unit and a color correcting unit. The first color space converting unit 40 converts the pixel value X in the RGB color space of each pixel of the image captured by the image capturing unit 31, into the pixel value X' in the YIQ color space. The color correcting unit 33 multiplies the pixel value X' in the YIQ color space, with the correction coefficient A', adds the pixel value X', and calculates the corrected RGB pixel value Y'.

The second color space converting unit 41 converts the image in the YIQ color space which is captured and corrected by the color correcting unit 33, into the RGB color space. The image converted into the RGB color space is γ-corrected by a γ correcting unit 34.

Figure 10:
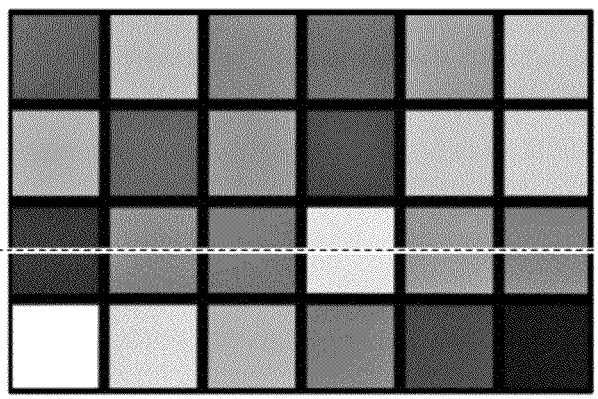
FIG. 10 is a view illustrating an example of an image obtained by correcting the image in FIG. 19 using a correction coefficient A'.
Figure 11:
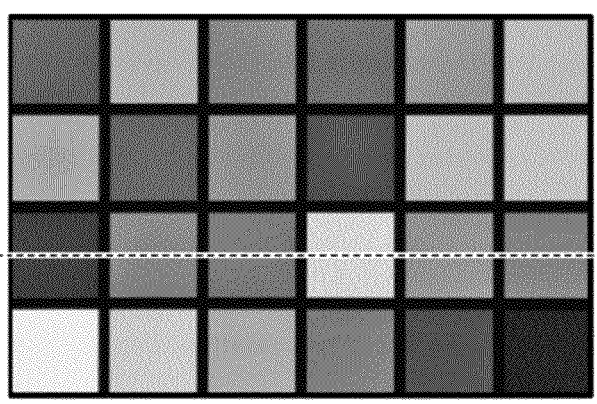
FIG. 11 is a view illustrating an example of an image obtained by correcting the image in FIG. 19 using the correction coefficient A'.

FIG. 10 is a view illustrating an example of an image obtained by correcting an image in FIG. 19 using the correction coefficient A'. In addition, the correction coefficient A' is calculated assuming that a weight coefficient λ=15 is true. Further, for comparison, the correction coefficient A is calculated by performing an operation in above equation 20 assuming that the same weight coefficient λ=15 is true, and an image obtained by correcting the image in FIG. 19 using the correction coefficient A according to equation 16 is illustrated. FIG. 11 is a view illustrating an example of an image obtained by correcting the image in FIG. 19 using the correction coefficient A. In FIG. 10, noise is reduced compared to FIG. 11.

Figure 12A:
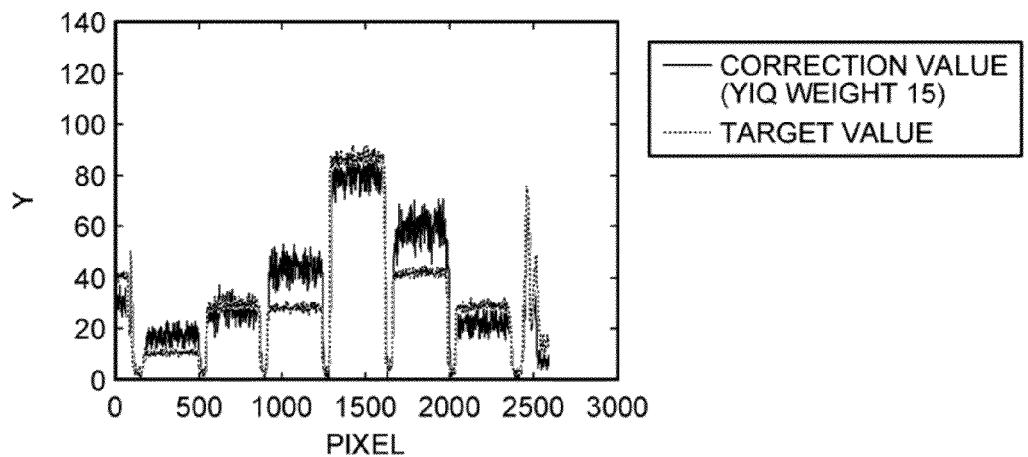
FIG. 12A is a graph illustrating an example where the brightness Y of corresponding pixels of the image in FIG. 18 and the image in FIG. 10 are compared.
Figure 12B:
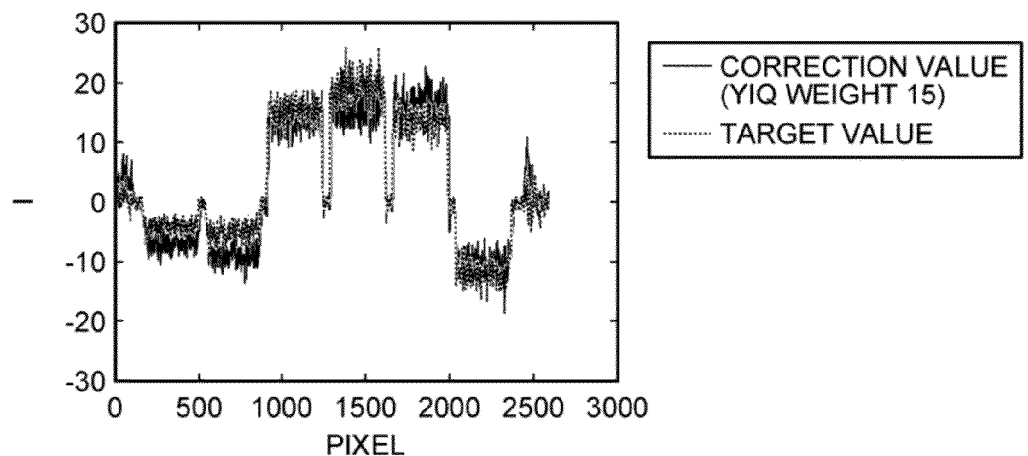
FIG. 12B is a graph illustrating an example where the color difference I between corresponding pixels of the image in FIG. 18 and the image in FIG. 10 is compared.
Figure 12C:
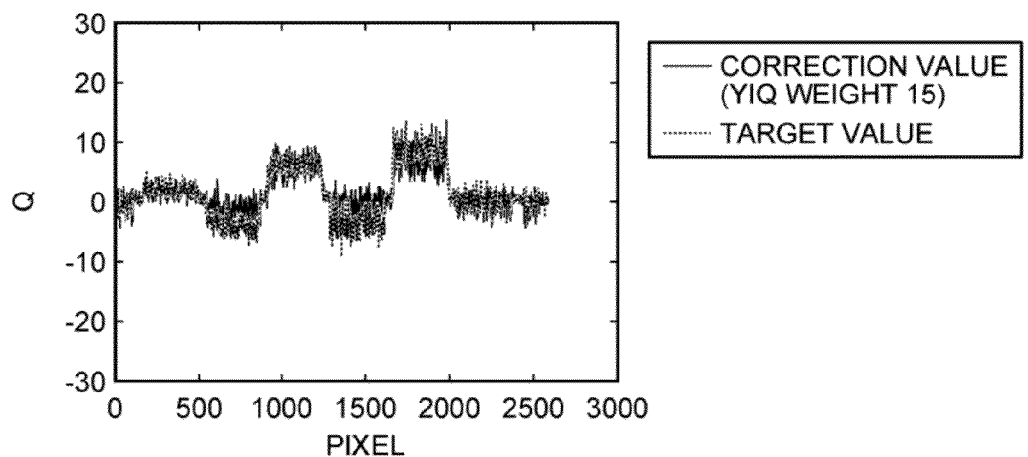
FIG. 12C is a graph illustrating an example where the color difference Q between corresponding pixels of the image in FIG. 18 and the image in FIG. 10 is compared.

Meanwhile, to clarify a change of an image resulting from correction, RGB values indicating colors are converted into brightness Y and color differences I and Q and are compared per corresponding pixel between an uncorrected image and a corrected image. FIG. 12A is a graph illustrating an example where the brightness Y of the image in FIG. 18 and the image in FIG. 10 are compared. With an example in FIG. 12A, the brightness Y of each pixel along the broken line in FIG. 18 is indicated as a target value, and the brightness Y of each pixel along the broken line in FIG. 10 is indicated as a correction value. FIG. 12B is a graph illustrating an example where the color difference I between corresponding pixels of the image in FIG. 18 and the image in FIG. 10 is compared. With an example in FIG. 12B, the color difference I of each pixel along the broken line in FIG. 18 is indicated as a target value, and the color difference I of each pixel along the broken line in FIG. 10 is indicated as a correction target. FIG. 12C is a graph illustrating an example where the color difference Q between corresponding pixels of the image in FIG. 18 and the image in FIG. 10 is compared. With an example in FIG. 12C, the color difference Q of each pixel along the broken line in FIG. 18 is indicated as a target value, and the color difference Q of each pixel along the broken line in FIG. 10 is indicated as a correction value.

Figure 13A:
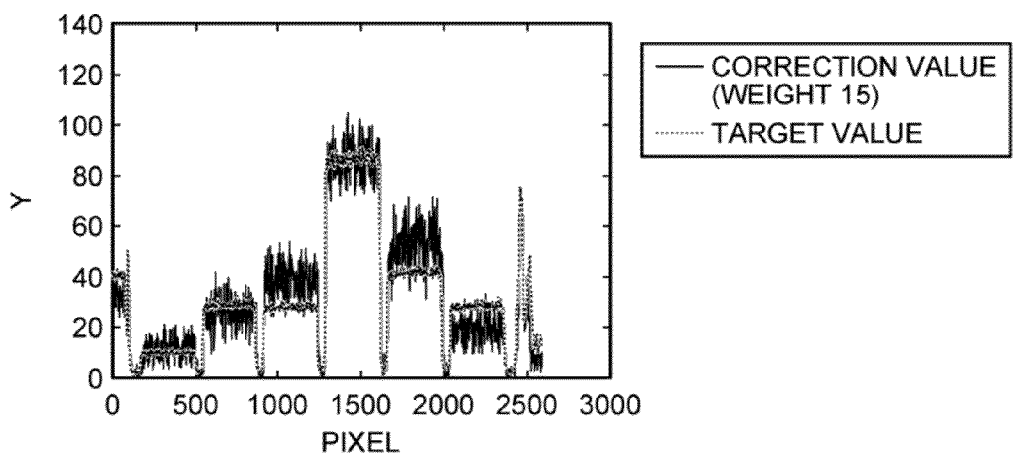
FIG. 13A is a graph illustrating an example where the brightness Y of corresponding pixels of the image in FIG. 18 and an image in FIG. 11 are compared.
Figure 13B:
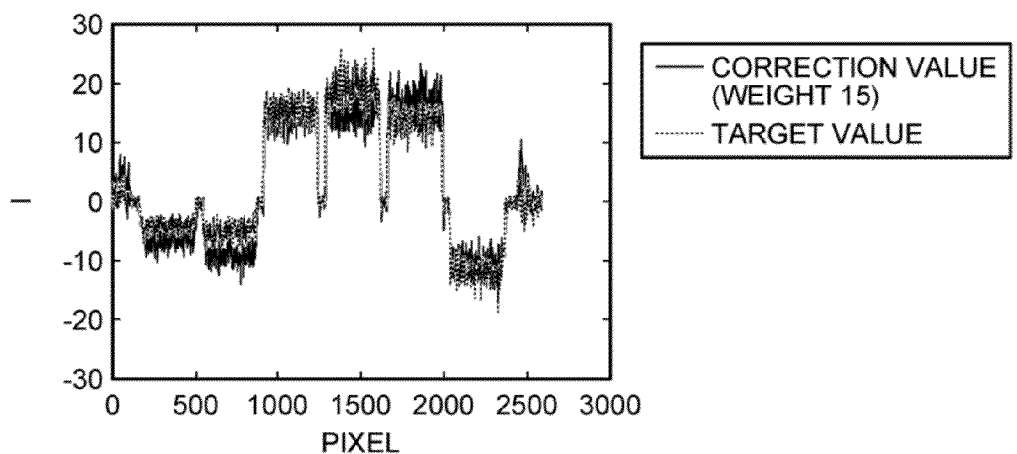
FIG. 13B is a graph illustrating an example where the color difference I between corresponding pixels of the image in FIG. 18 and the image in FIG. 11 is compared.
Figure 13C:
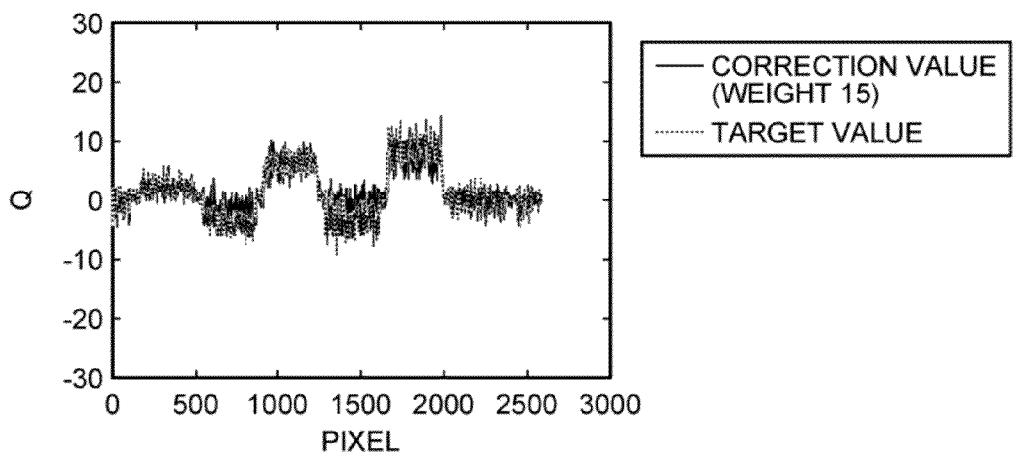
FIG. 13C is a graph illustrating an example where the color difference Q between corresponding pixels of the image in FIG. 18 and the image in FIG. 11 is compared.

Further, FIG. 13A is a graph illustrating an example where the brightness Y of corresponding pixels of the image in FIG. 18 and the image in FIG. 11 are compared. With an example in FIG. 13A, the brightness Y of each pixel along the broken line in FIG. 18 is indicated as a target value, and the brightness Y of each pixel along the broken line in FIG. 11 is indicated as a correction value. FIG. 13B is a graph illustrating an example where the color difference I between corresponding pixels of the image in FIG. 18 and the image in FIG. 11 is compared. With an example in FIG. 13B, the color difference I of each pixel along the broken line in FIG. 18 is indicated as a target value, and the color difference I of each pixel along the broken line in FIG. 11 is indicated as a correction value. FIG. 13C is a graph illustrating an example where the color difference Q between corresponding pixels of the image in FIG. 18 and the image in FIG. 11 are compared. With an example in FIG. 13C, the color difference Q of each pixel along the broken line in FIG. 18 is indicated as a target value, and the color difference Q of each pixel along the broken line in FIG. 11 is indicated as a correction value.

When FIGS. 12A and 13A are compared, a correction value of the brightness Y changes closer to the target value and in a smaller range in FIG. 12A. That is, noise resulting from correction is reduced more by performing correction using the correction coefficient A' calculated in the YIQ color space. Meanwhile, when FIGS. 12B and 13B and FIGS. 12C and 13C are compared, the color differences I and Q are substantially the same. That is, a change in the tinge of color resulting from correction is substantially the same.

The noise in the brightness Y is reduced more by performing correction using the correction coefficient A' is because the correction coefficient A' is calculated from the color difference in the YIQ color space as indicated in equations 26 and 27 and therefore the correction coefficient A' which is smaller than the difference between the brightness Y is calculated.

Thus, the imaging device 30 converts the color space of the image captured by the image capturing unit 31, into a color space of the brightness and the color difference. Further, the imaging device 30 stores as conversion information the correction coefficient A' which provides a minimum value of the sum of the norm of a difference between the color difference of the correction target color X from the target color Y and a correction color obtained by correcting the correction target color X using a correction coefficient in the color space of the brightness and the color difference, and a norm of the correction coefficient A' to which a predetermined weight coefficient is applied. Furthermore, the imaging device 30 converts the color of each pixel of the image converted into the color space of the brightness and the color difference, based on the conversion information. Consequently, the imaging device 30 can correct the image while suppressing occurrence of noise.

[d] Fourth Embodiment

Next, a fourth embodiment will be described. Configurations of an image capturing system 10, a conversion information storage device 20 and an imaging device 30 according to the fourth embodiment are substantially the same as in the image capturing system 10, the conversion information storage device 20 and the imaging device 30 according to the third embodiment illustrated in FIG. 8, and differences will be described.

Meanwhile, above equation 30 can be represented by following equation 31 when the unit matrix is I.

$$Y' = (I + A') \cdot X' \quad (31)$$

When this I+A' is a total correction coefficient $A'_{Total}$, equation 31 can be represented by following equation 32, and calculation can be simplified.

$$Y' = A'_{Total} \cdot X' \quad (32)$$

Hence, a calculating unit 22 calculates a correction coefficient A' from first image information 21a and second image information 21b stored in a memory unit 21, adds the unit matrix to the calculated correction coefficient A' and calculates the total correction coefficient $A'_{Total}$. Further, the calculating unit 22 has the memory unit 21 store the total correction coefficient $A'_{Total}$ as conversion information 21c. The total correction coefficient $A_{Total}$ stored in this memory unit 21 is stored in the memory unit 32 of the imaging device 30 by a storage unit 23.

Figure 14:
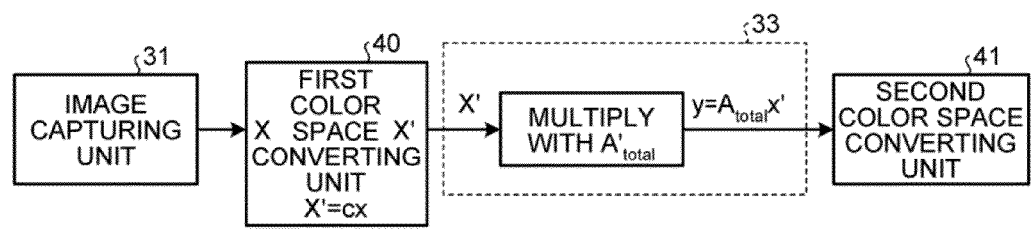
FIG. 14 is a view schematically illustrating a processing flow of the first color space converting unit and a color correcting unit.

A color correcting unit 33 reads the total correction coefficient $A'_{Total}$ stored in the memory unit 32 as the conversion information 21c. Further, the color correcting unit 33 performs an operation indicated in above equation 32 assuming that a YIQ pixel value of a pixel is X' per pixel of an image converted into a YIQ color space by a first color space converting unit 40, and calculates a corrected YIQ pixel value Y'. FIG. 14 is a view schematically illustrating a processing flow of a first color space converting unit and a color correcting unit. The first color space converting unit 40 converts a pixel value X in a RGB color space of each pixel of an image captured by an image capturing unit 31, into the pixel value X' in the YIQ color space. The color correcting unit 33 multiplies the pixel value X' in the YIQ color space, with the total correction coefficient $A'_{Total}$, and calculates the corrected RGB pixel value Y'.

Thus, the imaging device 30 stores the total correction coefficient $A'_{Total}$ obtained by adding the unit matrix to the correction coefficient A' as conversion information. Further, the imaging device 30 multiplies each color component forming a color of each pixel of the image captured by the image capturing unit, with the total correction coefficient $A'_{Total}$, and converts the color. Consequently, the imaging device 30 can reduce a load of processing of converting the color.

Further, the imaging device 30 converts the color of each pixel of the image using the total correction coefficient $A'_{Total}$ derived from the correction coefficient A' calculated in the color space of the brightness and the color difference. Consequently, the imaging device 30 can correct an image while suppressing occurrence of noise more.

[e] Fifth Embodiment

Figure 15:
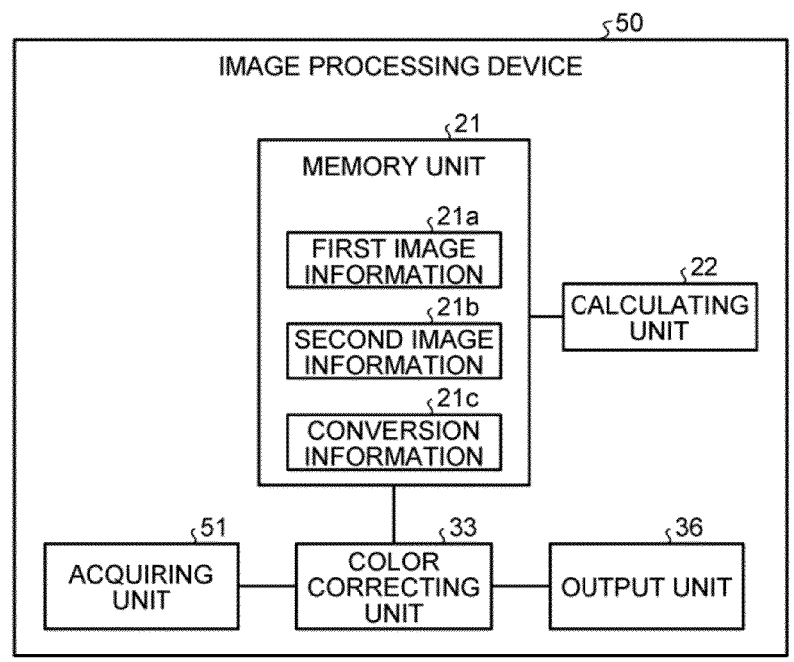
FIG. 15 is a view illustrating an example of a configuration of an image processing device.

Next, a fifth embodiment will be described. A case will be described with the fifth embodiment will be described where an image processing device 50 is configured to derive correction information, and correct an image using the derived correction information. FIG. 15 is a view illustrating an example of a configuration of an image processing device. In addition, the same portions as in the above first to fourth embodiments will be assigned the same reference numerals, and differences will be described. As illustrated in FIG. 15, the image processing device 50 has a memory unit 21, a calculating unit 22, a color correcting unit 33 and an output unit 36. Further, the image processing device 50 further has an acquiring unit 51.

The acquiring unit 51 acquires various pieces of information. For example, the acquiring unit 51 acquires a correction target image. The acquiring unit 51 may read and acquire the correction target image from a storage medium such as a flexible disk (FD), a CD-ROM (Compact Disk Read Only Memory) or an IC (Integrated Circuit) card inserted in the image processing device 50. Further, the acquiring unit 51 may acquire the correction target image through a network such as a public network, the Internet, a LAN (Local Area Network) or a WAN (Wide Area Network).

The memory unit 21 stores first image information 21a, second image information 21b, and conversion information 21c. The calculating unit 22 calculates a correction coefficient A of correcting the color of the image captured by the imaging device 30, from the first image information 21a and the second image information 21b. Further, the calculating unit 22 has the memory unit 21 store the calculated correction coefficient A as conversion information 21c.

The color correcting unit 33 corrects the color of the correction target image acquired by the acquiring unit 51. For example, the color correcting unit 33 reads the correction coefficient A stored in a memory unit 32 as the conversion information 21c. Further, the color correcting unit 33 performs an operation indicated in above equation 16 assuming that a RGB pixel value of a pixel is X per each pixel of the correction target image acquired by the acquiring unit 51, and calculates the corrected RGB pixel value Y. The output unit 36 outputs an image corrected by the color correcting unit 33. For example, the output unit 36 displays the image corrected by the color correcting unit 33. In addition, the output unit 36 may output the image corrected by the color correcting unit 33, to an external device.

Figure 16:
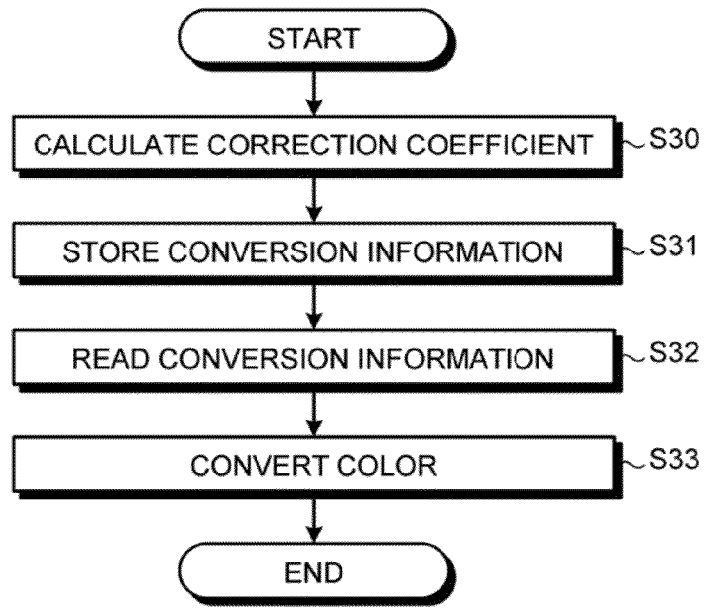
FIG. 16 is a flowchart illustrating process of image processing.

Next, an image processing flow of the image processing device 50 according to the present embodiment of correcting an image will be described. FIG. 16 is a flowchart illustrating process of image processing. This image processing is executed at, for example, a timing when a predetermined operation of instructing correction of the correction target image acquired by the acquiring unit 51 is performed.

As illustrated in FIG. 16, the calculating unit 22 calculates the correction coefficient A of correcting a color of an image captured by the imaging device 30, from the first image information 21a and the second image information 21b (step S30). The calculating unit 22 has the memory unit 21 store the calculated correction coefficient A as the conversion information 21c (step S31). The color correcting unit 33 reads the correction coefficient A stored in the memory unit 32 as the conversion information 21c (step S32). Further, the color correcting unit 33 performs an operation in equation 16 with respect to the correction target image using the read correction coefficient A, performs correction of converting the color (step S33) and finishes processing.

Thus, the image processing device 50 calculates the correction coefficient A which provides a minimum value of the sum of the norm of the difference between the color difference of a correction target color X from a target color Y and a correction color obtained by correcting the correction target color X using the correction coefficient A, and a norm of the correction coefficient A to which a predetermined weight coefficient is applied. Further, the image processing device 50 acquires the correction target image. Furthermore, the image processing device 50 converts the color of each pixel of the acquired image based on conversion information derived based on the calculated correction coefficient. Consequently, the image processing device 50 can correct the image while suppressing a change in the tinge of color and suppressing occurrence of noise.

[f] Sixth Embodiment

Although embodiments related to a disclosed device have been described above, the disclosed technique may be implemented in various forms in addition to the above embodiments. Hence, another embodiment included in the present invention will be described below.

Although a case has been described with the first embodiment as an example where a correction coefficient A is calculated in a RGB color space, the disclosed device is not limited to this. For example, the color space converting unit 24 is provided to the conversion information storage device 20 as in the third embodiment, and the color space converting unit 24 converts a target color Y and a correction target color X in a RGB color space into a color space of brightness and a color difference. Further, the calculating unit 22 calculates a correction coefficient A which provides a minimum value of the sum of a norm of a color difference of a correction target color X from a target color Y in the color space of the brightness and the color difference and a correction color obtained by correcting the correction target color X using a correction coefficient, and a norm of the correction coefficient A to which a predetermined weight coefficient is applied. Furthermore, the color space converting unit 24 may convert the calculated correction coefficient A into the RGB color space to store in a memory unit 32 of an imaging device 30. For this correction coefficient A, an element is determined to decrease a color difference in a YIQ color space as much as possible, so that it is possible to correct the image while suppressing occurrence of noise. Further, the imaging device 30 can correct the color of the image while suppressing occurrence of noise without converting a captured image into the YIQ color space once.

Furthermore, similar to the second embodiment, with the image processing device 50 according to the fifth embodiment, the calculating unit 22 has the memory unit 21 store a total correction coefficient $A_{Total}$ obtained by adding the unit matrix to the correction coefficient A. Still further, the color correcting unit 33 may perform the operation in equation 23 with respect to the correction target image using the correction coefficient $A_{Total}$, and perform correction of converting the color.

Moreover, similar to the conversion information storage device 20 according to the third embodiment, the image processing device 50 according to the above embodiment may be further provided with the color space converting unit 24, and convert first image information 21a and second image information 21b into the YIQ color space and calculate the correction coefficient A'.

Further, the image processing device 50 according to the above fifth embodiment does not need to calculate the correction coefficient A every time by means of the calculating unit 22 when an image is corrected. That is, when the image processing device 50 stores conversion information 21c in the memory unit 32, the image may be corrected using the stored conversion information 21c.

Further, although cases have been described with the above embodiments where a correction coefficient is calculated which provides a minimum value of the sum of a norm of a difference between a color difference of a correction target color from a target color and a correction color obtained by correcting the correction target color using a correction coefficient, and a norm of the correction coefficient to which a predetermined weight coefficient is applied. For example, according to numerical analysis, the conversion information storage device 20 may calculate a correction coefficient which is in a predetermined allowable range from a minimum value and which is recognized as the minimum value. For example, a reiterative solution technique may be adopted to perform reiterative calculation of the sum of norms start using a given default prediction value as a start of a correction coefficient such that the correction coefficient gradually converges to a solution, finish calculation at a step at which the correction coefficient is in the predetermined allowable range from the minimum value and obtain an approximate value.

Further, although cases have been described with the above embodiments where a color space of brightness and a color difference is a YIQ color space, the present invention is by no means limited to this. For example, the color space may be a YUV color space, a YCbCr color space, a YPbPr color space and a HLS color space. Further, a correction coefficient may be calculated by converting the color space into a color space such as the HSV color space including the luminance.

Furthermore, although cases have been described with the above embodiments where a correction coefficient is calculated and stored as correction information, the present invention is not limited to this. For example, the conversion information storage device 20 may generate a color conversion lookup table which associates a color before correction and a color after correction, from the correction coefficient, and have the imaging device 30 store the lookup table as correction information. In addition, the lookup table may be generated for all colors to convert the color. Further, the lookup table may be generated only for a specific color, and color conversion may be performed for a color other than the specific color by interpolating the specific color.

Furthermore, although cases have been described with the above embodiments where a weight coefficient to be multiplied with a correction coefficient using the Tikhonov regularizing method is $\lambda 2$, the present invention is not limited to this. For example, a weight coefficient to multiply may be changed. Another example of regularization includes, for example, LASSO regularization.

Further, the rate including infrared light varies depending on a lighting. For example, a fluorescent lamp includes a little infrared light. Meanwhile, an incandescent lamp includes greater infrared light. Hence, the conversion information storage device 20 may generate a plurality of patterns of correction information under different lighting environments and store the patterns in the imaging device 30, and the imaging device 30 may correct the color using correction information matching the lighting environment. The imaging device 30 may detect lighting environment by providing a detecting unit which detects the lighting environment, and decides the lighting environment based on a user's input.

Further, although cases have been described with the above embodiments where the conversion information storage device 20 generates one correction information and stores the correction information in the imaging device 30, the present invention is not limited to this. For example, the conversion information storage device 20 may generate a plurality of patterns of correction information using different weight coefficients $\lambda$ and store the patterns in the imaging device 30, and the imaging device 30 may select correction information from a plurality of patterns of correction information and correct the color. By receiving an input of specified image quality of a captured image from a user, the imaging device 30 may select correction information according to the received image quality.

Further, each illustrated component of each device is a functional concept, and each component does not need to be necessarily configured physically as illustrated. That is, a specific state of dispersion and integration of each device is not limited to the illustration, the entirety or part of each device may be configured to be dispersed and integrated functionally and physically in arbitrary units according to various loads and use situations. For example, each processing unit of the calculating unit 22, the storage unit 23 and the color space converting unit 24 of the conversion information storage device 20, and the color correcting unit 33, the γ correcting unit 34, the image quality adjusting unit 35, the first color space converting unit 40 and the second color space converting unit 41 of the imaging device 30 may be adequately integrated. Further, each processing unit of the calculating unit 22 and the color correcting unit 33 of the image processing device 50 may be adequately integrated. Furthermore, processing of each processing unit may be adequately separated to processings of a plurality of processing units. Still further, the entirety or arbitrary part of each processing function performed in each processing unit is realized by a CPU and a program which is analyzed and executed by the CPU, or is realized by hardware using a wired logic.

Conversion Information Storage Program

Figure 17:
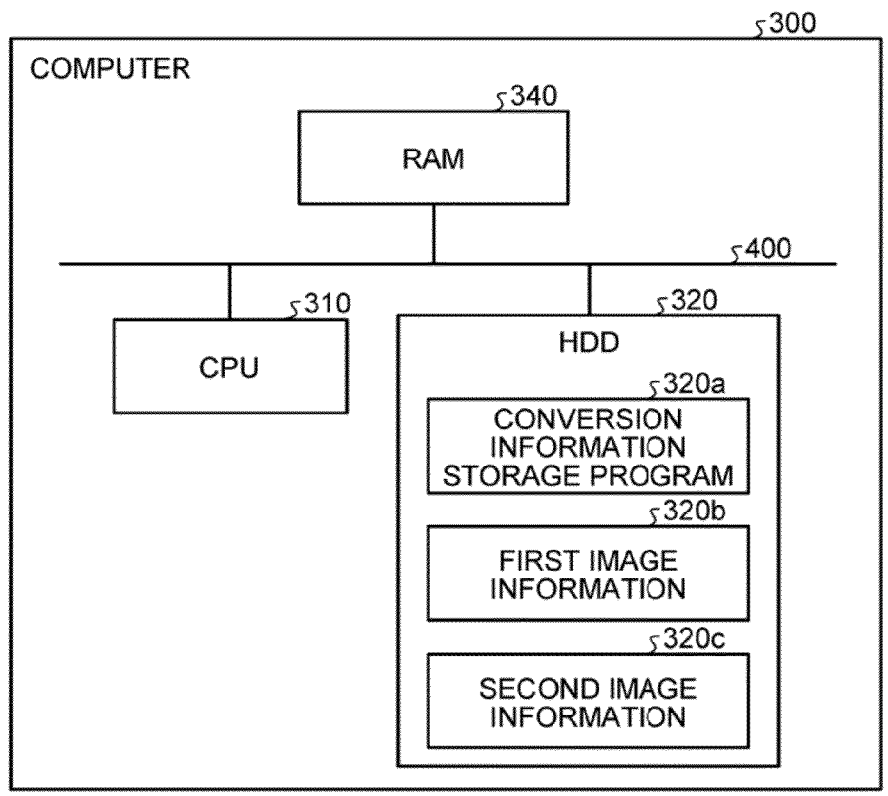
FIG. 17 is a view illustrating a computer which executes conversion information storage program.

Moreover, various processing described in the above embodiments can also be realized by executing a program prepared in advance by a computer system such as a personal computer or a work station. Hereinafter, an example of a computer system which executes a program having the same function as in the above embodiments will be described below. FIG. 17 is a view illustrating a computer which executes a conversion information storage program.

As illustrated in FIG. 17, a computer 300 has a CPU (Central Processing Unit) 310, a HDD (Hard Disk Drive) 320 and a RAM (Random Access Memory) 340. Each unit of these 300 to 340 is connected through a bus 400.

In the HDD 320, a conversion information storage program 320a which exhibit the same functions as the calculating unit 22, the storage unit 23 and the color space converting unit 24 of the above conversion information storage device 20 may be stored in advance. In addition, the conversion information storage program 320a may be adequately separated.

Further, the HDD 320 stores various pieces of information. For example, the HDD 320 stores first image information 320b and second image information 320c corresponding to the first image information 21a and the second image information 21b illustrated in FIG. 1.

Further, the CPU 310 reads the conversion information storage program 320a from the HDD 320, expands the conversion information storage program 320a to the RAM 340 and executes each processing using the first image information 320b and the second image information 320c stored in the HDD 320. That is, the conversion information storage program 320a executes the same operations as in the calculating unit 22, the storage unit 23, and the color space converting unit 24.

In addition, the above conversion information storage program 320a does not need to be necessarily stored in the HDD 320 from the first.

For example, the program is stored in a "portable physical medium" such as a flexible disk (FD), a CD-ROM, a DVD disk, a magnetooptical disk or an IC card inserted in the computer 300. Further, the computer 300 may read the program from the portable medium and execute the program.

Furthermore, a program is stored in "another computer (or server) connected to the computer 300 through a public network, the Internet, a LAN or a WAN. Still further, the computer 300 may read the program from another computer and execute the program.

According to an aspect of an imaging device of the present invention, it is possible to correct an image while suppressing a change in the tinge of color and preventing noise.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An imaging device comprising:
a memory unit that stores conversion information which is derived based on a correction coefficient which provides, in a predetermined allowable range from a minimum value, a sum of a norm of a difference between a color difference of a correction target color and a target color which is a target of correction of the correction target color and a correction color obtained by correcting the correction target color using the correction coefficient, and a norm of the correction coefficient to which a predetermined weight coefficient is applied;
an image capturing unit that captures an image; and
a color converting unit that converts a color of each pixel of the image captured by the image capturing unit, based on the conversion information stored in the memory unit.

2. The imaging device according to claim 1 further comprising
a color space converting unit that converts a color space of the image captured by the image capturing unit into a color space of brightness and a color difference, and
the memory unit stores the conversion information which is derived based on the correction coefficient which provides, in the predetermined allowable range from the minimum value, a sum of a norm of a difference between the color difference of the correction target color and the target color and the correction color obtained by correcting the correction target color using the correction coefficient in the color space of the brightness and the color difference, and the norm of the correction coefficient to which the predetermined weight coefficient is applied, and the color converting unit converts the color of each pixel of the image converted into the color space of the brightness and the color difference by the color space converting unit, based on the conversion information.

3. The imaging device according to claim 1, wherein
the memory unit stores the conversion information which is derived based on the correction coefficient which provides, in the predetermined allowable range from the minimum value, a sum of a norm of a difference between the color difference of the correction target color and the target color and the correction color obtained by correcting the correction target color using the correction coefficient in the color space of the brightness and the color difference, and the norm of the correction coefficient to which the predetermined weight coefficient is applied, and which is converted into a color space used for the image captured by the image capturing unit.

4. The imaging device according to claim 1, wherein
the memory unit stores as the conversion information a total correction coefficient obtained by adding a unit matrix to the correction coefficient, and
the color converting unit converts the color by multiplying each color component forming a color of each pixel of the image captured by the image capturing unit, with the total correction coefficient stored as the conversion information.

5. A non-transitory computer-readable recording medium having stored therein a program for causing a computer to execute a process for image processing, the process comprising:
storing, in a memory unit, conversion information which is derived based on a correction coefficient which provides, in a predetermined allowable range from a minimum value, a sum of a norm of a difference between a color difference of a correction target color and a target color which is a target of correction of the correction target color and a correction color obtained by correcting the correction target color using the correction coefficient, and a norm of the correction coefficient to which a predetermined weight coefficient is applied; and
converting a color of each pixel of a correction target image based on the conversion information stored in the memory unit.

6. The non-transitory computer-readable recording medium according to claim 5, wherein the process further comprising
additionally converting a color space of the correction target image into a color space of brightness and a color difference;
the storing stores, in the memory unit, the conversion information which is derived based on the correction coefficient which provides, in the predetermined allowable range from the minimum value, a sum of a norm of a difference between the color difference of the correction target color and the target color and the correction color obtained by correcting the correction target color using the correction coefficient in the color space of the brightness and the color difference, and the norm of the correction coefficient to which the predetermined weight coefficient is applied, and
the converting converts the color of each pixel of the image converted into the color space of the brightness and the color difference based on the conversion information.

7. The non-transitory computer-readable recording medium according to claim 5, wherein
the storing stores the conversion information which is derived based on the correction coefficient which provides, in the predetermined allowable range from the minimum value, a sum of a norm of a difference between the color difference of the correction target color and the target color and the color difference and the correction color obtained by correcting the correction target color using the correction coefficient in the color space of the brightness and the color difference, and the norm of the correction coefficient to which the predetermined weight coefficient is applied, and which is converted into a color space used for an image captured by an image capturing unit, and the converting converts the color of each pixel of the correction target image based on the conversion information.

8. The non-transitory computer-readable recording medium according to claim 5, wherein the converting converts the color by multiplying each color component forming a color of each pixel of the correction target image, with a total correction coefficient obtained by adding a unit matrix to the correction coefficient.

9. An image processing device comprising:

a calculating unit that calculates a correction coefficient which provides, in a predetermined allowable range from a minimum value, a sum of a norm of a difference between a color difference of a correction target color and a target color which is a target of correction of the correction target color and a correction color obtained by correcting the correction target color using the correction coefficient, and a norm of the correction coefficient to which a predetermined weight coefficient is applied;

an acquiring unit that acquires a correction target image; and a color converting unit that converts a color of each pixel of the correction target image acquired by the acquiring unit, based on conversion information derived based on the correction coefficient calculated by the calculating unit.

10. The image processing device according to claim 9 further comprising a color space converting unit that converts a color space of the target color and the correction target color into a color space of brightness and a color difference, and the calculating unit calculates the correction coefficient which provides, in the predetermined allowable range from the minimum value, a sum of a norm of a difference between the color difference of the correction target color and the target color and the correction color obtained by correcting the correction target color using the correction coefficient in the color space of the brightness and the color difference, and the norm of the correction coefficient to which the predetermined weight coefficient is applied.

11. The image processing device according to claim 10, wherein the color space converting unit converts the correction coefficient calculated by the calculating unit, into a color space used for the correction target image.

12. The image processing device according to claim 9, wherein the calculating unit calculates a total correction coefficient by adding a unit matrix to the correction coefficient.

13. A non-transitory computer-readable recording medium having stored therein a program for causing a computer to execute a process for image processing, the process comprising:

calculating a correction coefficient which provides, in a predetermined allowable range from a minimum value, a sum of a norm of a difference between a color difference of a correction target color and a target color which is a target of correction of the correction target color and a correction color obtained by correcting the correction target color using the correction coefficient, and a norm of the correction coefficient to which a predetermined weight coefficient is applied; and converting a color of each pixel of a correction target image based on conversion information derived based on the calculated correction coefficient.

14. The non-transitory computer-readable recording medium according to claim 13 wherein the process further comprising:

additionally converting a color space of the target color and the correction target color into a color space of brightness and a color difference; and the calculating calculates the correction coefficient which provides, in the predetermined allowable range from the minimum value, a sum of a norm of a difference between the color difference of the correction target color and the target color and the color difference and the correction color obtained by correcting the correction target color using the correction coefficient in the color space of the brightness and the color difference, and the norm of the correction coefficient to which the predetermined weight coefficient is applied.

15. The non-transitory computer-readable recording medium according to claim 14 wherein the additionally converting converts the calculated correction coefficient into a color space used for the correction target image.

16. The non-transitory computer-readable recording medium according to claim 13 wherein the calculating calculates a total correction coefficient by adding a unit matrix to the correction coefficient.

* * * * *